United States Patent [19]

Mihara et al.

[11] Patent Number: 5,149,619
[45] Date of Patent: Sep. 22, 1992

[54] SILVER HALIDE PHOTOGRAPHIC EMULSION

[75] Inventors: Yuji Mihara; Toshinao Ukai, both of Kanagawa, Japan

[73] Assignee: Fuji Photo Film Co., Ltd., Kanagawa, Japan

[21] Appl. No.: 755,595

[22] Filed: Sep. 5, 1991

Related U.S. Application Data

[63] Continuation of Ser. No. 435,881, Nov. 14, 1989, abandoned.

[30] Foreign Application Priority Data

Nov. 15, 1988 [JP] Japan ................... 63-288058

[51] Int. Cl.$^5$ ............................................. G03C 1/02
[52] U.S. Cl. ................................. 430/572; 430/582; 430/584; 430/595; 430/600; 430/607; 430/613; 430/61 H; 430/944
[58] Field of Search .............. 430/944, 600, 584, 595, 430/613, 614, 607, 582, 572

[56] References Cited

U.S. PATENT DOCUMENTS

| | | |
|---|---|---|
| 2,131,038 | 9/1938 | Brooker et al. . |
| 3,326,681 | 6/1967 | Walworth . |
| 3,954,478 | 5/1976 | Arai et al. ................ 430/600 |
| 4,536,473 | 8/1985 | Mihara ..................... 430/575 |
| 4,801,525 | 1/1989 | Mihara et al. .............. 430/518 |

FOREIGN PATENT DOCUMENTS

| | | |
|---|---|---|
| 0098213 | 1/1984 | European Pat. Off. . |
| 2234155 | 10/1987 | Japan . |

Primary Examiner—Charles L. Bowers, Jr.
Assistant Examiner—Thorl Chea
Attorney, Agent, or Firm—Sughrue, Mion, Zinn Macpeak & Seas

[57] ABSTRACT

A silver halide photographic emulsion is disclosed, comprising a combination of at least one infrared sensitizing dye represented by formula (Ia) or (Ib) and at least one compound represented by formula (IIa) or (IIb):

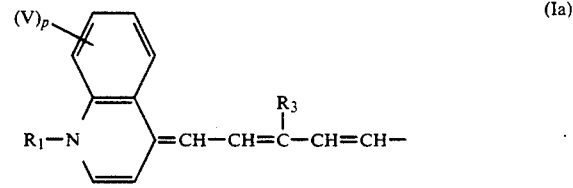

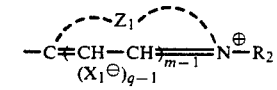

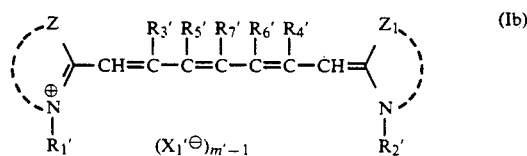

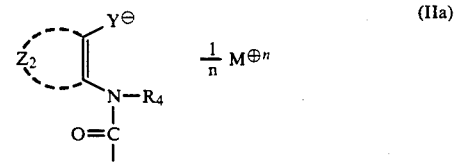

wherein each of the variables is as defined in the specification.

13 Claims, No Drawings

SILVER HALIDE PHOTOGRAPHIC EMULSION

This a continuation of application Ser. No. 07/435,881, filed Nov. 14, 1989, now abandoned.

FIELD OF THE INVENTION

This invention relates to a silver halide photographic emulsion which is used in a silver halide photographic material which is spectrally sensitized to the infrared region and, more precisely, it relates to a silver halide emulsion which is used in a silver halide photographic material which has improved sensitivity to the infrared spectral region and improved storage properties.

BACKGROUND OF THE INVENTION

In one method of exposing a photographic photosensitive material, an image is formed using a so-called scanner system in which an original is scanned and a silver halide photographic material is exposed on the basis of an image signal, and an image is formed as a negative image or as a positive image corresponding to the image on the original.

There are various recording devices in which image formation via a scanner system is used in practice, and conventionally glow lamps, xenon lamps, mercury vapor lamps, tungsten lamps and light emitting diodes, for example, have been used as the light sources for recording purposes in scanner type recording systems of this type. However, these light sources all suffer from the disadvantages of weak output and short life expectancy in practical use. Scanners in which coherent laser light sources, such as Ne-He lasers, argon lasers and He-Cd lasers for example, are used as light sources have been proposed as a means of overcoming these problems. It is possible to obtain high outputs in this way, but the apparatus is larger and more expensive and a modulator is required, and there is a further disadvantage in that safe-lighting for the photosensitive material is limited since visible light is used for exposure, and handlability is adversely affected.

On the other hand, semiconductor lasers are small, cheap and easily modulated, and they have a longer life expectancy than the lasers mentioned above. Moreover, if a photosensitive material which is sensitive to the infrared region is used, then since the light emission is in this region, there is a distinct advantage in that bright safelights can be used and handlability is greatly improved. However, there is no photosensitive material which has a high sensitivity in the infrared region and excellent storage properties and so it has not been possible to realize the characteristics of the semiconductor lasers which provide superior performance as described above.

An "HIE135-20" film made by Eastman Kodak Company is an example of a commercially available infrared sensitized film, but this material cannot be stored at room temperature and it must be stored in a refrigerator or freezer. Thus, the conventional infrared sensitized photosensitive materials are unstable in respect of photographic speed, and special consideration must be given to their storage.

In one technique for the manufacture of photographic photosensitive materials, the photosensitive wavelength region is extended to the long wavelength side by adding certain types of cyanine dye to the silver halide photographic emulsion, which is to say that spectral sensitization techniques are used, and these spectral sensitization techniques can be applied not only to the visible region but also to the infrared region. Sensitizing dyes which absorb infrared light are used for infrared region spectral sensitization, and such dyes have been described, for example, by Mees, *The Theory of the Photographic Process*, Third Edition, pages 198–201 (published by MacMillan, 1966). In this case the spectral sensitivity, which is to say the sensitivity to light in the infrared region, should be high, and any change in photographic speed on storing the emulsion should be slight. A number of sensitizing dyes have been developed for this purpose in the past.

Thus, dyes of this type have been disclosed, for example, in U.S. Pat. Nos. 2,095,854, 2,095,856, 2,955,939, 3,482,978, 3,552,974, 3,573,921 and 3,582,344. However, it cannot be said that the photographic speed and storage properties are adequate when the sensitizing dyes disclosed in these patents are used.

On the other hand, spectral sensitivity can be increased markedly by adding certain types of specially selected second organic compounds to photosensitive materials in addition to the spectral sensitizing dyes, and the resulting effect is known as supersensitization. In general, the addition of a second organic compound or an inorganic compound does not increase the sensitivity, and it may even lower the sensitivity in many cases, and so supersensitization can be said to be a special phenomenon and very careful selection is required for the sensitizing dyes and second organic compounds or inorganic compounds which are used in such combinations. Moreover, it is thought that slight differences in chemical structure have a pronounced effect on this supersensitizing action and it is difficult to predict supersensitizing combinations on the basis of chemical structure alone. Second organic compounds for supersensitization purposes known at present time include, for example, the triazine derivatives disclosed in U.S. Pat. Nos. 2,875,058 and 3,695,888, the mercapto compounds disclosed in U.S. Pat. No. 3,457,078, the thiourea compounds disclosed in U.S. Pat. No. 3,458,318, and the pyrimidine derivatives disclosed in U.S. Pat. No. 3,615,632, and it has also been disclosed that infrared sensitization can be achieved using smaller amounts of infrared sensitizing dyes by using the azaindene compounds disclosed in U.S. Pat. No. 4,011,083.

The infrared photographic speed is certainly increased with the methods disclosed in these patents, and fairly good storage properties have also been observed, depending on the particular case, but as yet they are still inadequate, and a means of supersensitization which provides a large increase in infrared photographic speed and good storage properties is still required.

SUMMARY OF THE INVENTION

An object of the present invention is to provide a silver halide photographic emulsion which can be used in a silver halide photographic material which has a high photographic speed in respect of infrared light.

A second object of the present invention is to provide a silver halide photographic emulsion which can be used in a silver halide photographic material with which there is a little change in photographic speed or fogging on storage and which has a high photographic speed with respect to infrared light.

The above mentioned and other objects of the present invention have been realized by including in a silver halide photographic emulsion at least one infrared sensitizing dye represented by formula (Ia) or (Ib) described below, and at least one compound represented by formula (IIa) or (IIb) described below.

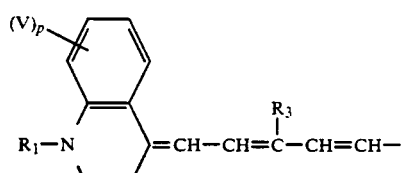

(Ia)

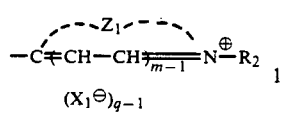

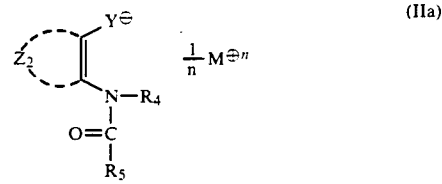

(IIa)

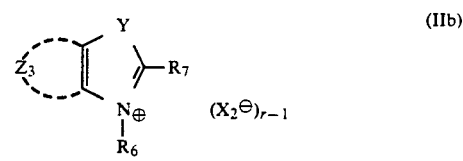

(IIb)

In formula (Ia), $R_1$ and $R_2$ may be the same or different, and each represents an alkyl group; $R_3$ represents a hydrogen atom, a lower alkyl group, a lower alkoxy group, a phenyl group, a benzyl group or a phenethyl group; V represents a hydrogen atom, a lower alkyl group, an alkoxy group or a halogen atom; $Z_1$ represents a group of non-metal atoms which is required to complete a five or six membered nitrogen-containing heterocyclic ring; $X_1$ represents an acid anion; and m, p and q each independently represents 1 or 2, provided that when an intramolecular salt is formed, then q is 1.

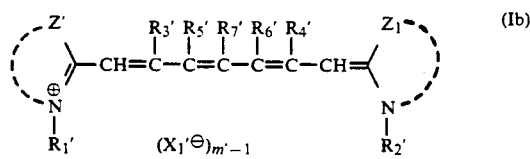

(Ib)

In formula (Ib), $R_1'$, and $R_2'$ may be the same or different and each represents an alkyl group; $R_3'$ and $R_4'$ each individually represents a hydrogen atom, a lower alkyl group, a lower alkoxy group, a phenyl group, a benzyl group or a phenethyl group; $R_5'$ and $R_6'$ each represents a hydrogen atom, or $R_5'$ and $R_6'$ may b joined together to form a divalent alkylene group; $R_7'$ represents a hydrogen atom, a lower alkyl group, a lower alkoxy group, a phenyl group, a benzyl group or

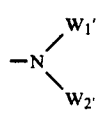

group, wherein $W_1'$ and $W_2'$ each independently represents an alkyl group or an aryl group, or $W_1'$ and $W_2'$ may be joined together to form a five or six membered nitrogen-containing heterocyclic ring; $R_3'$ and $R_7'$, or $R_4'$ and $R_7'$, may be joined together to form a divalent alkylene group, Z' and $Z_1'$ each independently represent a group of non-metal atoms which is required to complete a five or six membered nitrogen-containing heterocyclic ring; $X_1'$ represents an acid anion; and m' represents 1 or 2, provided that when the dye forms an intramolecular salt, then m' is 1.

In formulae (IIa) and (IIb), $R_4$ represents an alkyl group or an alkenyl group; $R_6$ represents a substituted alkyl group or a substituted alkenyl group; $R_5$ and $R_7$ each represents a hydrogen atom, an alkyl group or an aryl group; Y represents an oxygen atom, a sulfur atom, a selenium atom or a tellurium atom; $Z_2$ and $Z_3$ each represents atoms which are required to complete an aromatic ring; $M^{\oplus n}$ represents an onium ion, an ion of a group IA or group IIA element, or a cation of atomic valency n selected from among the metal ions of groups IIB, VIIB, IVA or VA; $X_2$ has the same significance as $X_1$ in formula (I); and r represents 1 or 2, provided that when the compound forms an intramolecular salt, then r is 1.

DETAILED DESCRIPTION OF THE INVENTION

The infrared sensitizing dyes represented by formula (Ia) are described in detail below.

$R_1$ and $R_2$ may be the same or different and each represents a substituted or unsubstituted alkyl group, and the preferred alkyl groups have from 1 to 8 carbon atoms, for example, methyl, ethyl, propyl, butyl, pentyl, heptyl or octyl. The substituted alkyl groups are alkyl groups (which preferably have not more than 6 carbon atoms) substituted with a carboxyl group, a sulfo group, a cyano group, a halogen atom (for example, fluorine, chlorine, bromine), hydroxyl groups, an alkoxycarbonyl group (which preferably has not more than 8 carbon atoms, for example, methoxycarbonyl, ethoxycarbonyl, benzyloxycarbonyl), an alkoxy group (which preferably has not more than 7 carbon atoms, for example, methoxy, ethoxy, propoxy, butoxy, benzyloxy), aryloxy groups (for example, phenoxy, p-tolyloxy), an acyloxy group (which preferably has not more than 3 carbon atoms, for example, acetyloxy, propionyloxy), an acyl group (which preferably has not more than 8 carbon atoms, for example, acetyl, propionyl, benzoyl, mesyl), a carbamoyl group (for example, carbamoyl, N,N-dimethylcarbamoyl, morpholinocarbamoyl, piperidinocarbamoyl), a sulfamoyl group (for example, sulfamoyl, N,N-dimethylsulfamoyl, morpholinosulfonyl) or an aryl group (for example, phenyl, p-hydroxyphenyl, p-carboxyphenyl, p-sulfophenyl, α-naphthyl) as substituent groups. These alkyl groups may be substituted with combinations of two or more of these substituent groups.

$R_3$ represents a hydrogen atom, a lower alkyl group (which preferably has from 1 to 4 carbon atoms, for example, methyl, ethyl, propyl, butyl), a lower alkoxy group (which preferably has from 1 to 4 carbon atoms, for example, methoxy, ethoxy, propoxy, butoxy), a phenyl group, a benzyl group or a phenethyl group. Moreover, $R_3$ preferably represents a lower alkyl group or a benzyl group.

V represents a hydrogen atom, a lower alkyl group (which preferably has from 1 to 4 carbon atoms, for example, methyl, ethyl, propyl, butyl), an alkoxy group (which preferably has from 1 to 4 carbon atoms, for example, methoxy, ethoxy, butoxy) or a halogen atom (for example, fluorine, chlorine), wherein the lower alkyl group includes a substituted alkyl group (which preferably has from 1 to 4 carbon atoms, for example, trifluoromethyl, carboxymethyl).

$Z_1$ represents a group of non-metal atoms which is required to form a five or six membered nitrogen-containing heterocyclic group, and the ring which is formed may be a thiazole nucleus (for example, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]-thiazole), a selenazole nucleus (for example, benzoselenazole, 5-chlorobenzoselenazole, 5-methoxybenzoselenazole, 5-methylbenzoselenazole, 5-hydroxybenzoselenazole, naphtho[2,1-d]selenazole, naphtho[1,2-d]selenazole), an oxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluoromethylbenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, naphtho[2,3-d]oxazole), a quinoline nucleus (for example, 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, 8-fluoro-4-quinoline), a 3,3-dialkylindolenine nucleus (for example, 3,3-dimethyindolenine, 3,3-diethylindolenine, 3,3-dimethyl-5-cyanoindolenine, 3,3-dimethyl-5-methoxyindolenine, 3,3-dimethyl-5-methylindolenine, 3,3-dimethyl-5-chloroindolenine), an imidazole nucleus (for example, 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-ethyl-5-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, 1-ethylnaphtho[1,2-d]imidazole), or a pyridine nucleus (for example, pyridine, 5-methyl-2-pyridine, 3-methyl-4-pyridine). Of these, the thiazole nucleus and the oxazole nucleus are preferred. Moreover, the use of the benzothiazole nucleus, the naphthothiazole nucleus, the naphthoxazole nucleus or the benzoxazole nucleus is especially desirable. Moreover, m, p and q each individually has a value of 1 or 2, with q being 1 when the dye forms an intramolecular salt.

X represents an acid anion (for example, chloride, bromide, iodide, tetrafluoroborate, hexafluorophosphate, methylsulfate, ethylsulfate, benzenesulfonate, 4-methylbenzenesulfonate, 4-chlorobenzenesulfonate, 4-nitrobenzenesulfonate, trifluoromethanesulfonate, perchlorate).

Next, the infrared sensitizing dyes represented by formula (Ib) are described in detail below.

The alkyl groups represented by $R_1'$ and $R_2'$ include substituted alkyl groups, and specific example of such groups are the same as those described in connection with $R_1$ and $R_2$ in formula (Ia).

Special examples of $R_3'$ and $R_4'$ are the same as those described in connection with $R_3$ in formula (Ia).

$R_5'$ and $R_6'$ each represents a hydrogen atom, or they may be joined together to form a divalent alkylene group (for example, ethylene, trimethylene). Such an alkylene group may be substituted with one or more appropriate groups, for example, an alkyl groups (which preferably has from 1 to 4 carbon atoms, for example, methyl, ethyl, propyl, isopropyl, butyl), a halogen atom (for example, chlorine, bromine), or an alkoxy group (which preferably has from 1 to 4 carbon atoms, for example, methoxy, ethoxy, propoxy, isopropoxy, butoxy).

$R_7'$ represents a hydrogen atom, a lower alkyl group (which preferably has from 1 to 4 carbon atoms, for example, methyl, ethyl, propyl), a lower alkoxy group (which preferably has from 1 to 4 carbon atoms, for example, methoxy, ethoxy, propoxy, butoxy), a phenyl group, a benzyl group or an

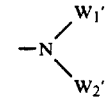

group, wherein $W_1'$ and $W_2'$ each independently represents an alkyl group (including a substituted alkyl group, of which the alkyl moiety preferably has from 1 to 18, most desirably from 1 to 4, carbon atoms, for example, methyl, ethyl, propyl, butyl, benzyl, phenethyl) or an aryl group (including a substituted phenyl group, for example, phenyl, naphthyl, tolyl, p-chlorophenyl), and $W_1'$ and $W_2'$ may be joined together to form a five or six membered nitrogen-containing heterocyclic ring. Furthermore, $R_3'$ and $R_7'$, or $R_4'$ and $R_7'$, may be joined together to form a divalent alkylene group (the same as the aforementioned divalent alkylene groups formed by the joining together of $R_5'$ and $R_6'$).

Specific examples of the five or six membered nitrogen-containing heterocyclic rings formed by $Z'$ and $Z_1'$ are the same as those described in connection with $Z_1$ in formula (Ia).

Specific examples of the acid anion $X_1'$ are the same as the acid ions described in connection with $X_1$ in formula (Ia).

Moreover, m' represents 0 or 1, and is 1 when the dye forms an intramolecular salt.

Specific examples of infrared sensitizing dyes which can be represented by formula (Ia) or formula (Ib) are indicated below. However, the invention is not limited to just these infrared sensitizing dyes.
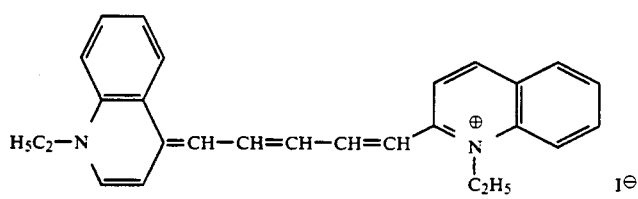
(Ia-1)
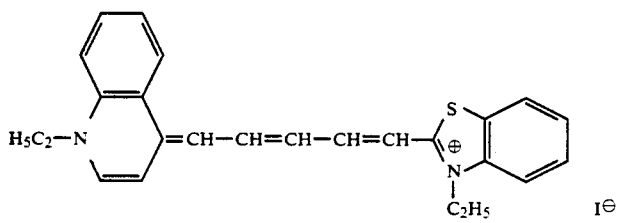
(Ia-2)
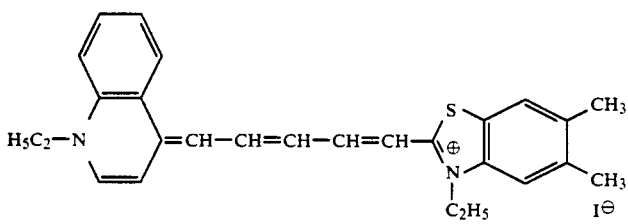
(Ia-3)
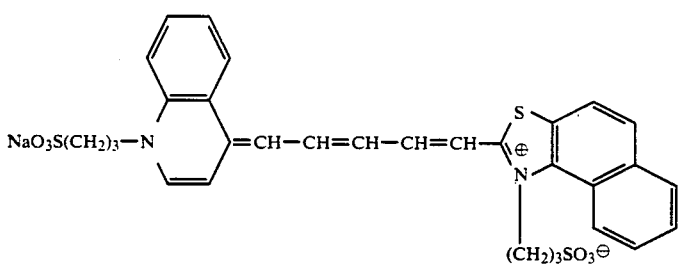
(Ia-4)
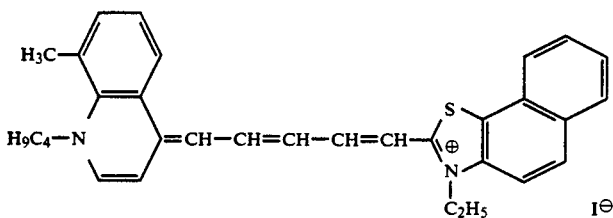
(Ia-5)
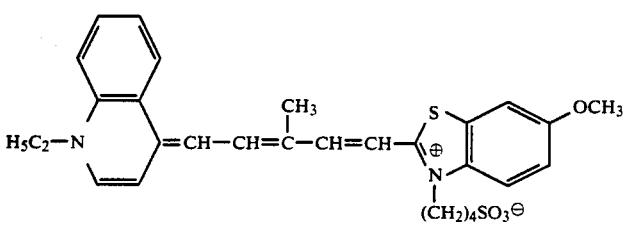
(Ia-6)

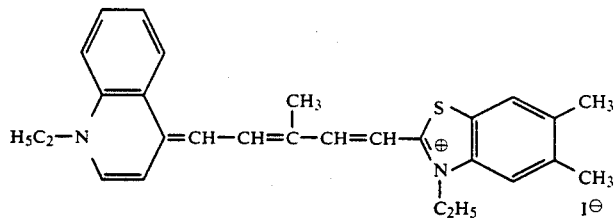
(Ia-7)
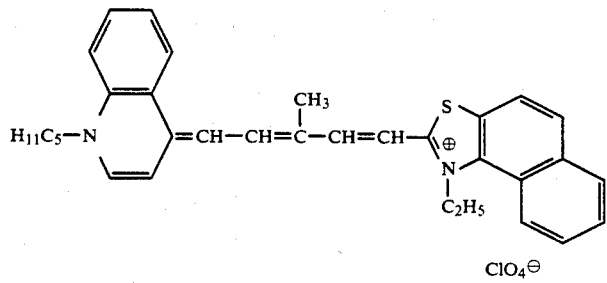
(Ia-8)
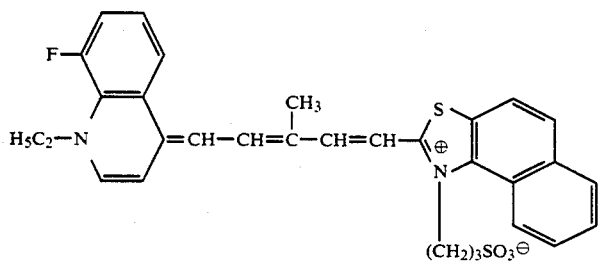
(Ia-9)
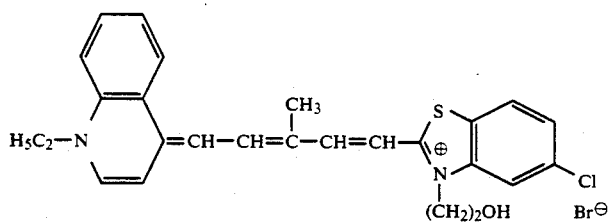
(Ia-10)
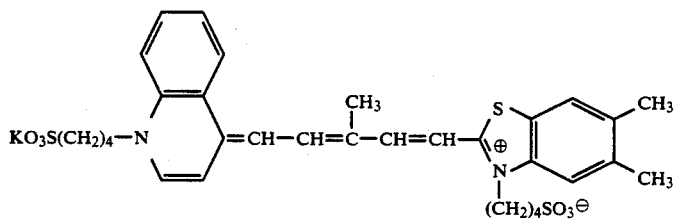
(Ia-11)
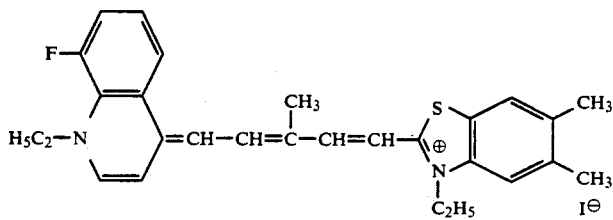
(Ia-12)

-continued
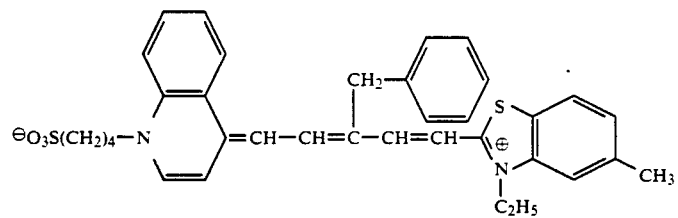
(Ia-13)
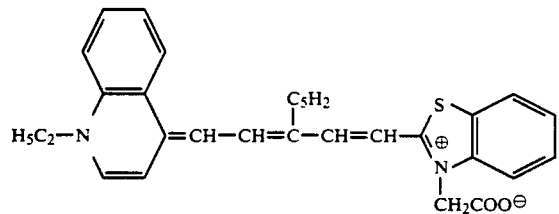
(Ia-14)
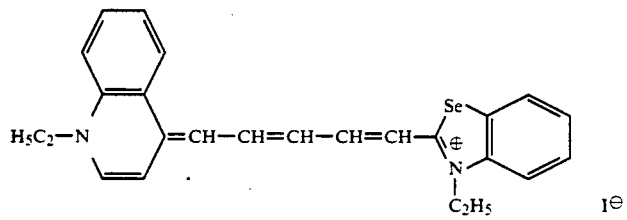
(Ia-15)
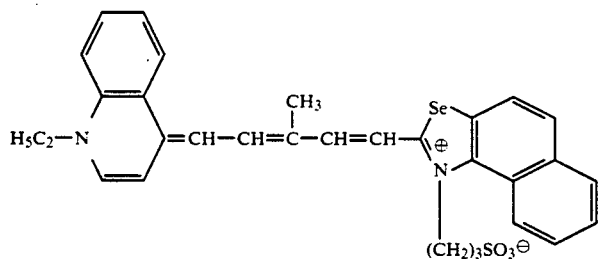
(Ia-16)
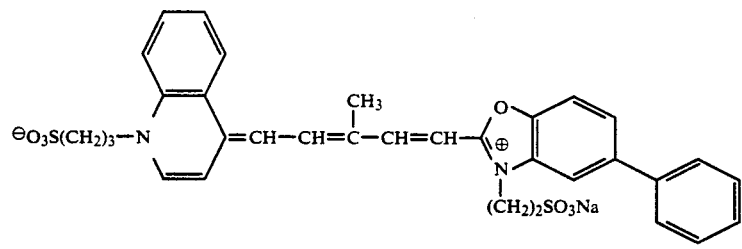
(Ia-17)
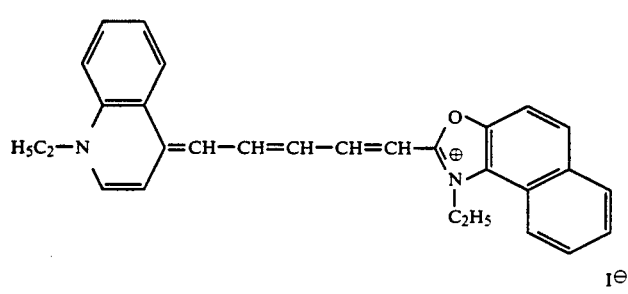
(Ia-18)

-continued
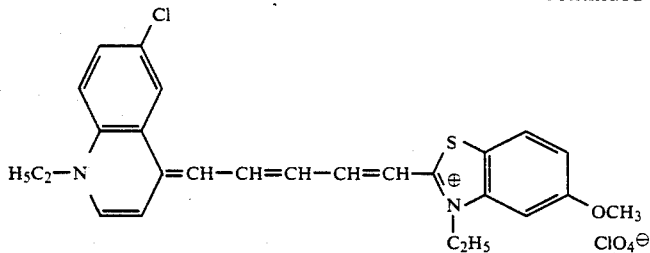 (Ia-19)
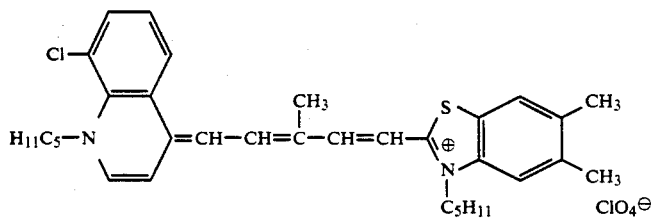 (Ia-20)
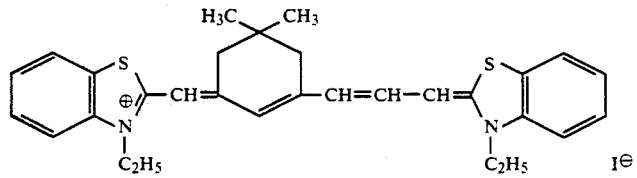 (Ib-1)
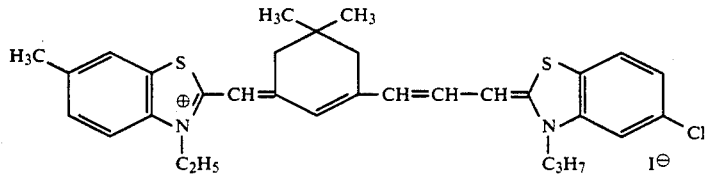 (Ib-2)
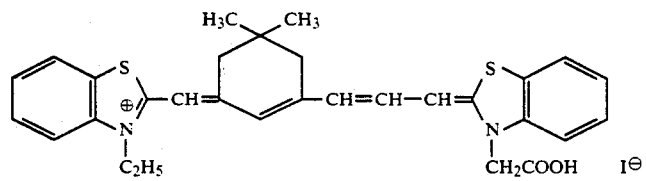 (Ib-3)
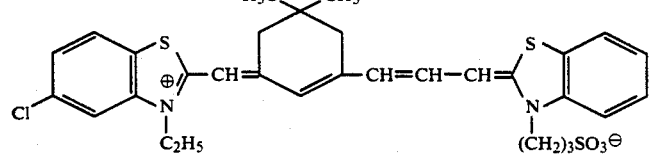 (Ib-4)
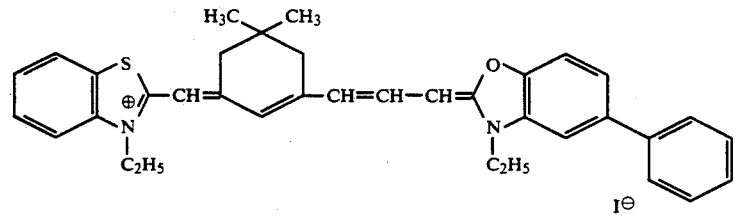 (Ib-5)
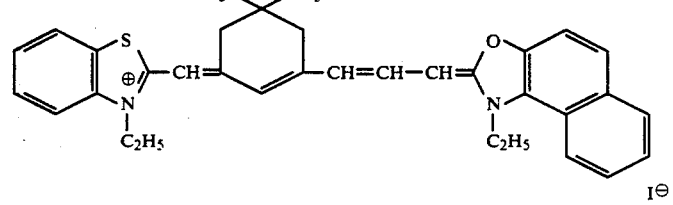 (Ib-6)

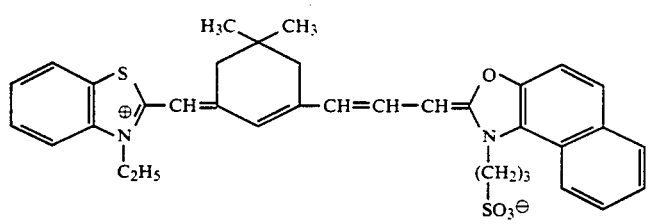
(Ib-7)
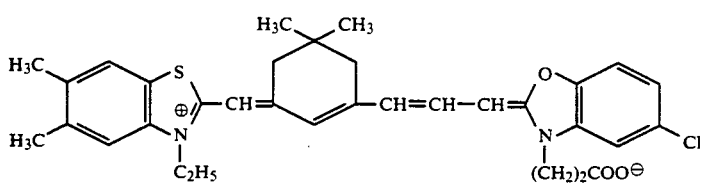
(Ib-8)
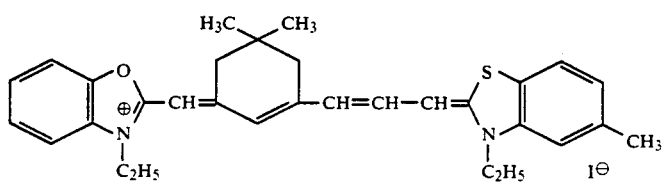
(Ib-9)
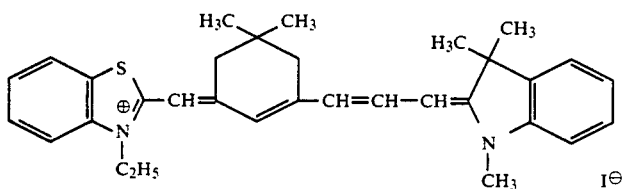
(Ib-10)
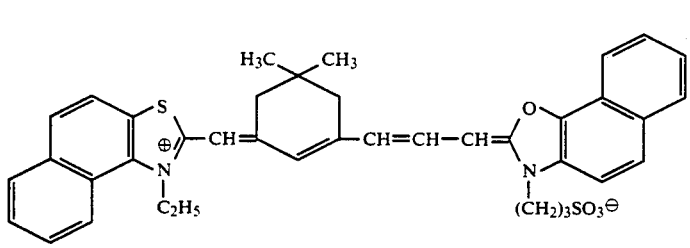
(Ib-11)
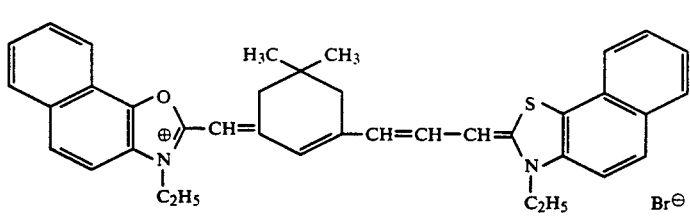
(Ib-12)
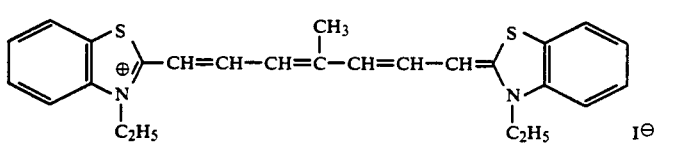
(Ib-13)
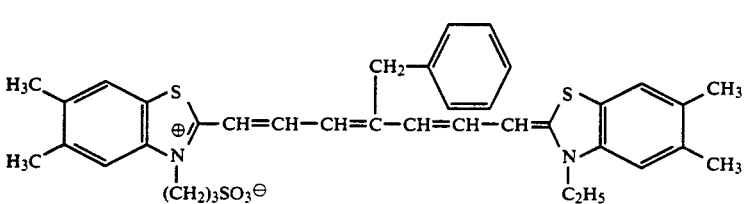
(Ib-14)

-continued

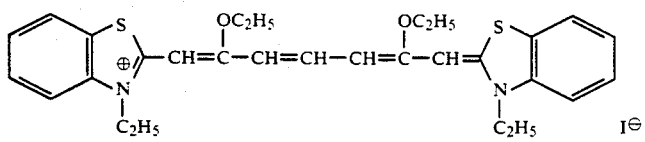 (Ib-15)

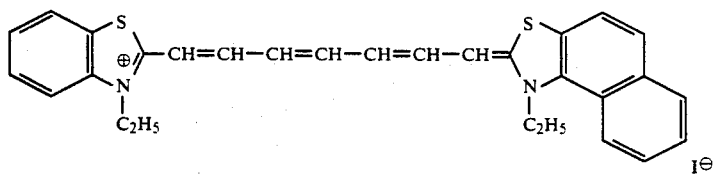 (Ib-16)

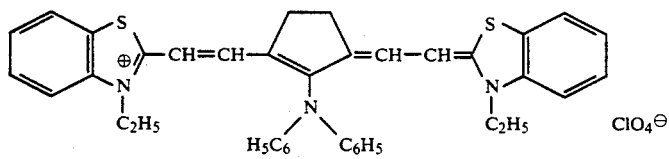 (Ib-17)

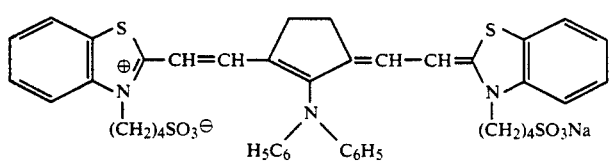 (Ib-18)

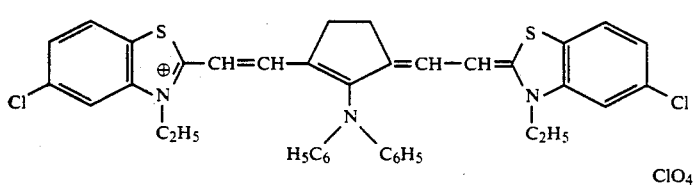 (Ib-19)

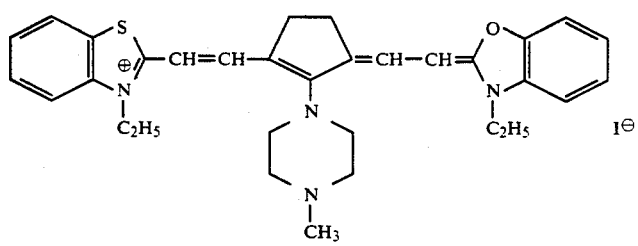 (Ib-20)

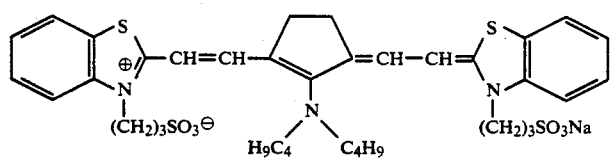 (Ib-21)

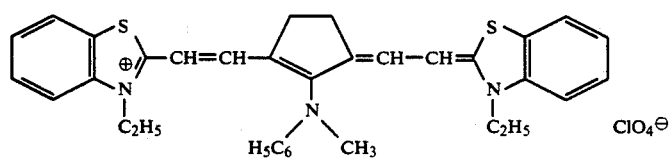 (Ib-22)

The infrared sensitizing dyes represented by formula (Ia) can be prepared using the method disclosed in JP-A-59-192242, and the infrared sensitizing dyes represented by formula (Ib) can be prepared using the methods disclosed, for example, in U.S. Pat. Nos. 3,482,978 and 2,756,227. (The term "JP-A" as used herein signifies an "unexamined published Japanese patent application".)

The infrared sensitizing dyes of formula (Ia) are especially desirable because of their superior sensitizing characteristics in the infrared region.

Then, the compounds represented by formulae (IIa) and (IIb) are described below.

The alkyl groups represented by R₄ include substituted alkyl groups, and specific examples of these groups are the same as those described in connection with $R_1$ and $R_2$ in formula (Ia).

The alkylene groups represented by R₄ include substituted alkenyl groups. These groups preferably have from 3 to 8 carbon atoms, being allyl, 3-butenyl, 2-butenyl, 4-pentenyl, 3-pentenyl or 5-hexenyl groups, for example. The substituent groups may be those described as substituent groups for the alkyl groups represented by $R_1$ and $R_2$ in formula (Ia).

$R_6$ may have the substituent groups described in connection with $R_1$ and $R_2$ in formula (Ia) as the substituent groups for the substituted alkyl group or substituted alkenyl group, and the alkyl moieties which are substituted with such substituent groups preferably have from 1 to 8 carbon atoms and the alkenyl moieties which are substituted with such substituent groups preferably have from 3 to 8 carbon atoms. Examples of such groups include methoxymethyl, phenylethyl, ethoxypropyl, carboxypropyl, chloropropyl, benzylallyl, chloroethyl, phenylpropyl, fluoroethyl and methylsulfonamidoethyl.

$R_5$ and $R_7$ each represents a hydrogen atom, an alkyl group (including substituted alkyl groups, which preferably has from 1 to 8 carbon atoms, for example, methyl, ethyl, propyl, butyl, pentyl, heptyl, octyl, and these groups may be substituted with the substituent groups described in connection with $R_1$ and $R_2$ in formula (Ia), and the alkyl moiety which is substituted with these substituent groups preferably has from 1 to 8 carbon atoms) or an aryl group (including substituted aryl groups, which preferably has from 6 to 12 carbon atoms, for example, phenyl, naphthyl, and these groups may be substituted with the substituent groups described in connection with $R_1$ and $R_2$ in formula (Ia), and the aryl moieties which are substituted with these substituent groups preferably have from 6 to 12 carbon atoms).

The aromatic rings completed by $Z_2$ and $Z_3$ preferably include from 6 to 10 ring carbon atoms (for example, phenyl, naphthyl).

Useful substituent groups for $Z_2$ and $Z_3$ include the substituent groups described in connection with $R_1$ and $R_2$ in formula (Ia).

The cation M represents an inorganic or organic cation (for example, ammonium, sulfonium, alkylammonium, arylammonium, alkylsulfonium or arylsulfonium), the ion of a metal of group IA of the periodic table (alkali metals, for example, lithium, sodium, potassium), the ion of an alkaline earth metal of group IIA of the periodic table (for example, magnesium, calcium, strontium), or the ion of a metal of group IIB, VIIB, IVA or VA of the periodic table (for example, manganese, cadmium, lead or bismuth). (The periodic table referred to in this specification is that shown on page 268 of *Webater's Seventh New Collegiate Dictionary*, published by the G & G Morrlam Company of Springfield, Mass., U.S.A., in 1969.)

$X_2$ represents an acid anion, and it includes those described in connection with $X_1$ in formula (Ia).

Specific examples of compounds which can be represented by formulae (IIa) and (IIb) are indicated below. However, the invention is not limited to just these compounds.

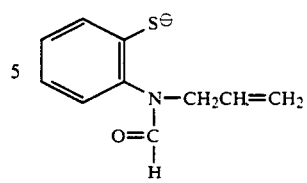
(IIa-1) ½Pb⁺⁺

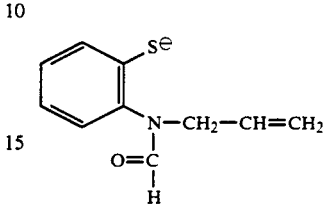
(IIa-2) ½Zn⁺⁺

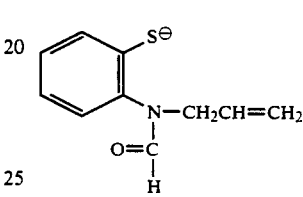
(IIa-3) ½Ca⁺⁺

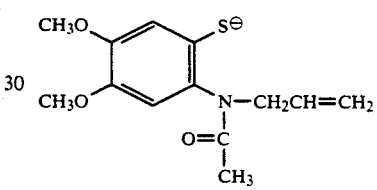
(IIa-4) Na⁺

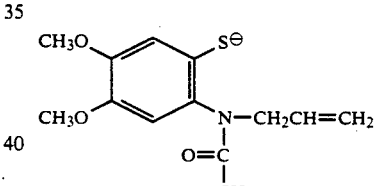
(IIa-5) ½Pb⁺⁺

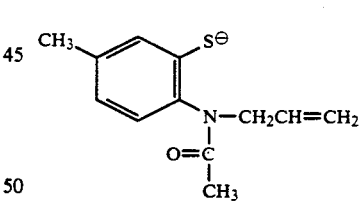
(IIa-6) Na⁺

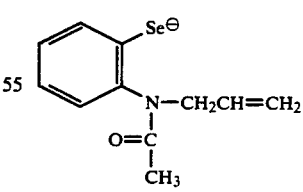
(IIa-7) Na⁺

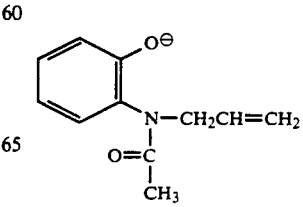
(IIa-8) Na⁺

-continued
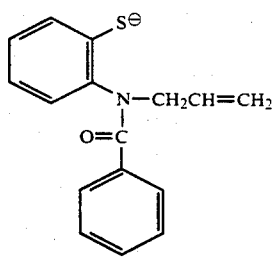 (IIa-9) K+
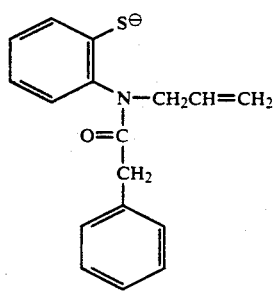 (IIa-10) Na+
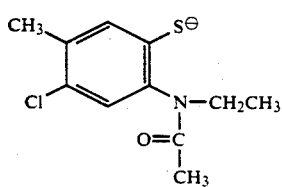 (IIa-11) K++
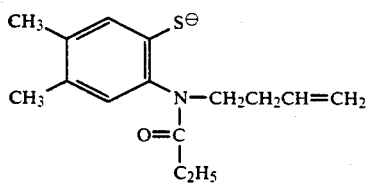 (IIa-12) Na+
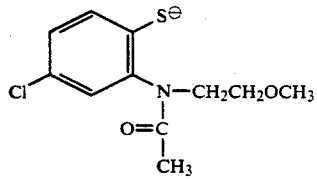 (IIa-13) Na+
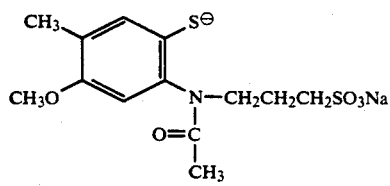 (IIa-14) Na+
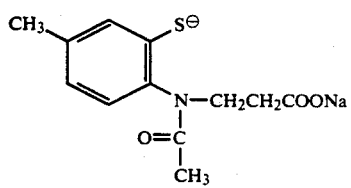 (IIa-15) Na+
-continued
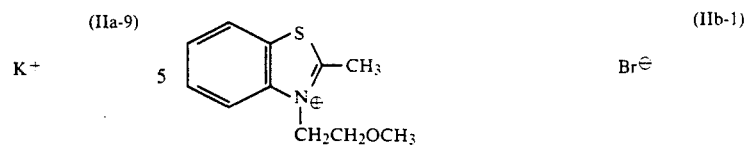 (IIb-1) Br⊖
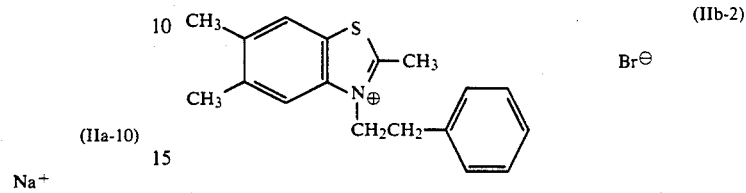 (IIb-2) Br⊖
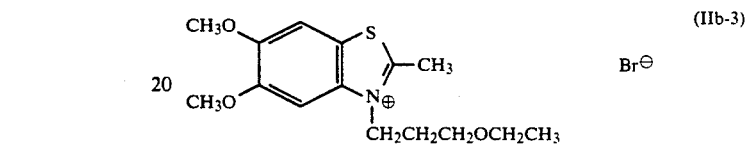 (IIb-3) Br⊖
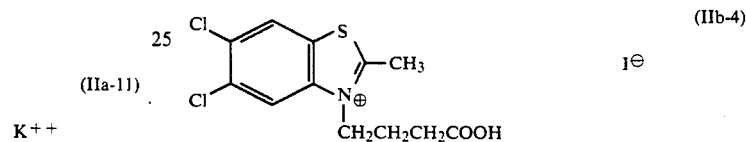 (IIb-4) I⊖
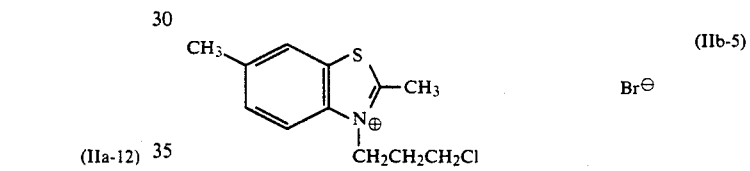 (IIb-5) Br⊖
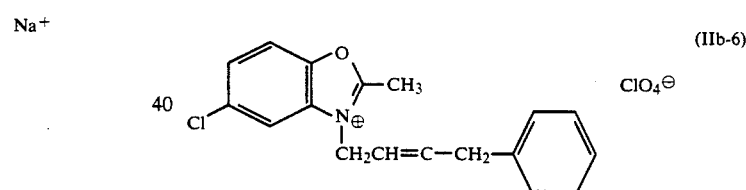 (IIb-6) ClO4⊖
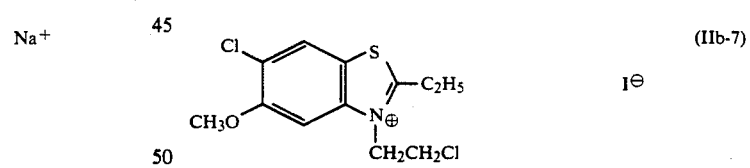 (IIb-7) I⊖
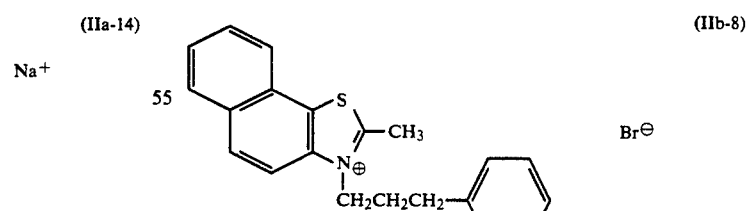 (IIb-8) Br⊖
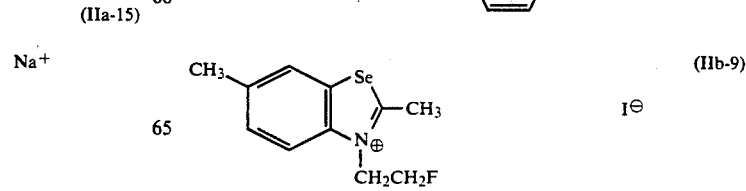 (IIb-9) I⊖

-continued

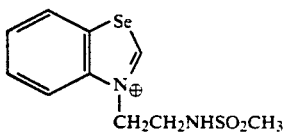

(IIb-10)

Br⊖

The compounds represented by formula (IIa) can be prepared using the method described in JP-A-59-26731.

The compounds represented by formula (IIb) can be prepared easily by via a quaternization reaction using the appropriate halide compounds, sulfonic acid esters, sulfuric acid esters, etc.

The compounds represented by formula (IIa) are preferred in view of their pronounced supersensitizing effect.

The infrared sensitizing dyes represented by formula (Ia) or (Ib) which are used in the present invention are included in the silver halide photographic emulsion in an amount of from $5 \times 10^{-7}$ mol to $5 \times 10^{-3}$ mol, preferably in an amount of from $1 \times 10^{-6}$ mol to $1 \times 10^{-3}$ mol, and most desirably an amount of from $2 \times 10^{-6}$ mol to $5 \times 10^{-4}$ mol, per mol of silver halide.

The infrared sensitizing dyes of formula (Ia) or (Ib) used in the present invention can be dispersed directly in the emulsion. Furthermore, they may be added to the emulsion in the form of a solution after being dissolved in a suitable solvent, for example, methyl alcohol, ethyl alcohol, methyl cellosolve, acetone, water, pyridine or mixtures of these solvents. Moreover, ultrasonics can be employed to form the solution.

Further, methods in which the dye is dissolved in a volatile organic solvent, the solution is dispersed in a hydrophilic colloid and the dispersion is added to the emulsion as disclosed, for example, in U.S. Pat. No. 3,469,987; methods in which the water insoluble dye is dispersed in a water soluble solvent without being dissolved and the dispersion is added to the emulsion as disclosed, for example, in JP-B-46-24185; methods in which the dye is dissolved in a surfactant and the solution is added to the emulsion as disclosed in U.S. Pat. No. 3,822,135; methods in which a solution is formed using a compound which provides a wavelength shift and the solution is added to the emulsion as disclosed in JP-A-51-74624; and methods in which the dye is dissolved in an acid which is essentially water free and the solution is added to the emulsion, as disclosed in JP-A-50-80826; can all be used for the addition of the infrared sensitizing dyes of formula (Ia) or (Ib). (The term "JP-B" as used herein signifies an "examined Japanese patent publication".) Moreover, the methods disclosed, for example, in U.S. Pat. Nos. 2,912,343, 3,342,605, 2,996,287 and 3,429,835 can also be used for making the addition to an emulsion.

The above mentioned infrared sensitizing dyes of formula (Ia) or (Ib) may be dispersed uniformly in a silver halide emulsion prior to coating on a suitable support and they may, of course, be dispersed at any stage during the preparation of the silver halide emulsion. Dyes of formula (Ia) and dyes of formula (Ib) can be used conjointly.

The compounds represented by formula (IIa) or (IIb) which are used in the invention are usefully used in the emulsion in an amount of from about 0.01 gram to about 5 grams per mol of silver halide.

The proportion (by weight) of the infrared sensitizing dye of formula (Ia) or (Ib) and the compound represented by formula (IIa) or (IIb) is preferably within the range (dye of formula (Ia) or (Ib)/compound represented by formula (IIa) or (IIb))=1/1 to 1/300, and the value of this ratio is most desirably from 1/2 to 1/100.

The compounds represented by formula (IIa) or (IIb) which are used in this invention can be dispersed directly in the emulsion, or they can also be dissolved in an appropriate solvent (for example, water, methyl alcohol, ethyl alcohol, propanol, methyl cellosolve, acetone) or in a mixture of these solvents for addition to the emulsion. They can also be added to an emulsion in the form of a solution or of a dispersion in a colloid in accordance with the methods described above in connection with the addition of the sensitizing dyes.

The compounds represented by formula (IIa) or formula (IIb) may be added to the emulsion before or after the addition of the sensitizing dyes which are represented by formula (Ia) or formula (Ib). Furthermore, the compounds of formula (IIa) or (IIb) and the sensitizing dyes of formula (Ia) or (Ib) can be dissolved separately and added separately to the emulsion at the same time, or they can be added to the emulsion after mixing. Furthermore, they may be caused to migrate into an emulsion layer by diffusion after addition to and coating in another layer.

Compounds of formula (III) as indicated below can also be added to the combinations of the present invention.

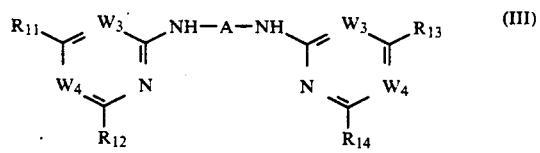

(III)

In formula (III), A represents a divalent aromatic residual group. $R_{11}$, $R_{12}$, $R_{13}$ and $R_{14}$ each represents a hydrogen atom, a hydroxyl group, an alkyl group, an alkoxy group, an aryloxy group, a halogen atom, a heterocyclic nucleus, a heterocyclic thio group, an arylthio group, an amino group, a substituted or unsubstituted alkylamino group, a substituted or unsubstituted arylamino group, a substituted or unsubstituted aralkylamino group or a mercapto group.

However, at least one of the groups represented by A, $R_{11}$, $R_{12}$, $R_{13}$ and $R_{14}$ has a sulfo group. $W_3$ and $W_4$ each represents —CH= or —N= groups. However, at least one of $W_3$ and $W_4$ represents an —N= group.

Formula (III) is described in detail below.

The —A— group represents a divalent aromatic residual group, and these groups may contain —$SO_3$M groups (where M represents a hydrogen atom or a cation which provides water solubility, for example, sodium, potassium). The —A— groups are usefully selected from among those indicated under —$A_1$— and —$A_2$— below. However, when there is no —$SO_3$M group in $R_{11}$, $R_{12}$, $R_{13}$ or $R_{14}$, then —A— is selected from among the —$A_1$— group.

—A₁—:

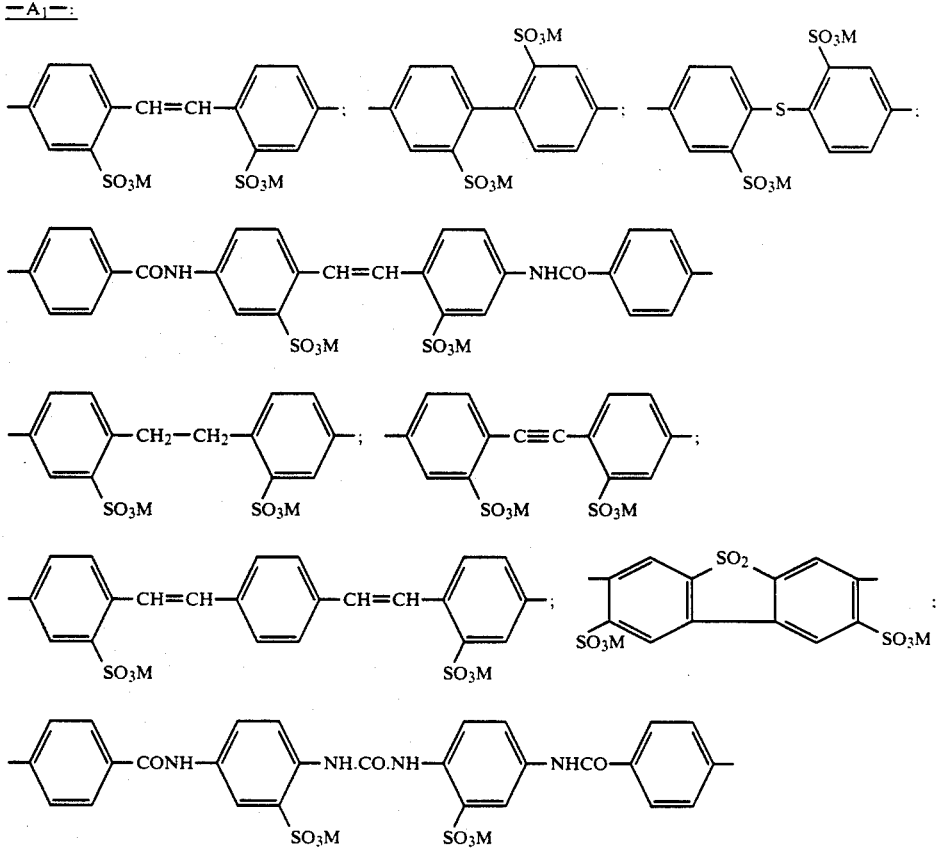

In these formulae, M represents a hydrogen atom or a cation which provides water solubility, for example, sodium or potassium.

—A₂—:

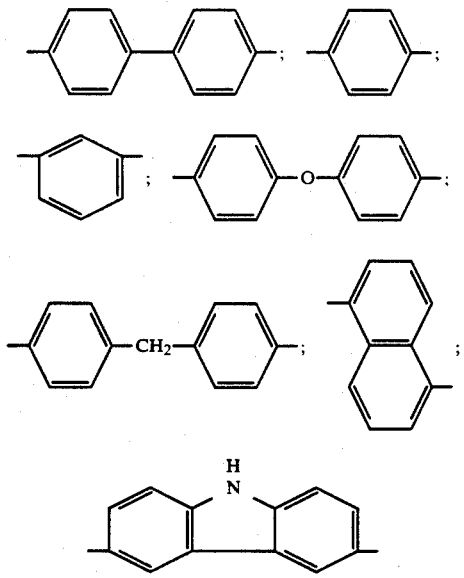

$R_{11}$, $R_{12}$, $R_{13}$ and $R_{14}$ each represents a hydrogen atom, a hydroxyl group, a lower alkyl group (which preferably has from 1 to 8 carbon atoms, for example, methyl, ethyl, n-propyl, n-butyl), an alkoxy group (which preferably has from 1 to 8 carbon atoms, for example, methoxy, ethoxy, propoxy, butoxy), an aryloxy group (for example, phenoxy, naphthoxy, o-tolyloxy, p-sulfophenoxy), a halogen atom (for example, chlorine, bromine), a heterocyclic nucleus (for example, morpholinyl, piperidyl), an alkylthio group (for example, methylthio, ethylthio), a heterocyclic thio group (for example, benzothiazolylthio, benzimidazolylthio, phenyltetrazolylthio), an arylthio group (for example, phenylthio, tolylthio), an amino group, a substituted or unsubstituted alkylamino group (for example, methylamino, ethylamino, propylamino, dimethylamino, diethylamino, dodecylamino, cyclohexylamino, β-hydroxyethylamino, di-(β-hydroxyethyl)amino, β-sulfoethylamino), a substituted or unsubstituted arylamino group (for example, anilino, o-sulfoanilino, m-sulfoanilino, p-sulfoanilino, o-toluidino, m-toluidino, p-toluidino, o-carboxy-anilino, m-carboxyanilino, p-carboxyanilino, o-chloroanilino, m-chloroanilino, p-chloroanilino, p-aminoanilino, o-anisidino, m-anisidino, p-anisidino, o-acetaminoanilino, hydroxyanilino, disulfophenylamino, naphthylamino, sulfonaphthylamino), a heterocyclic amino group (for example, 2-benzothiazolylamino, 2-pyridylamino), a substituted or unsubstituted aralkylamino group (for example, benzylamino, o-anisylamino, m-anisylamino, p-anisylamino), an aryl group (for example, phenyl), or a mercapto group. $R_{11}$, $R_{12}$, $R_{13}$ and $R_{14}$ may be the same or different. In those cases where —A— is selected from among the —A₂— group, at least one of the groups $R_{11}$, $R_{12}$, $R_{13}$ and $R_{14}$ must have at least one sulfo group (which may be a free sulfo group or in the form of a salt). $W_3$ and $W_4$ each represents —CH= or —N= groups, and at least one of these groups is an —N= group.

Specific examples of compounds which can be represented by formula (III) are indicated below, but these compounds are not limited to just those indicated herein.

(III-1) Disodium 4,4'-bis[4,6-di(benzothiazolyl-2-thio)-pyrimidine-2-ylamino]stilbene-2,2'-disulfonate
(III-2) Disodium 4,4'-bis[4,6-di(benzothiazolyl-2-amino)pyrimidine-2-ylamino]stilbene-2,2'-disulfonate
(III-3) Disodium 4,4'-bis[4,6-di(naphthyl-2-oxy)pyrimidine-2-ylamino]stilbene-2,2'-disulfonate
(III-4) Disodium 4,4'-bis[4,6-di(naphthyl-2-oxy)pyrimidine-2-ylamino]bibenzyl-2,2'-disulfonate
(III-5) Disodium 4,4'-bis(4,6-dianilinopyrimidine-2-ylamino)-stilbene-2,2'-disulfonate
(III-6) Disodium 4,4'-bis[4-chloro-6-(2-naphthyloxy)-pyrimidine-2-ylamino]biphenyl-2,2'-disulfonate
(III-7) Disodium 4,4'-bis[4,6-di(1-phenyltetrazolyl-5-thio)pyrimidine-2-ylamino]stilbene-2,2'-disulfonate
(III-8) Disodium 4,4'-bis[4,6-di(benzimidazolyl-2-thio)-pyrimidine-2-ylamino]stilbene-2,2'-disulfonate
(III-9) Disodium 4,4'-bis(4,6-diphenoxypyrimidine-2-ylamino)stilbene-2,2'-disulfonate
(III-10) Disodium 4,4'-bis(4,6-diphenylthiopyrimidine-2-ylamino)stilbene-2,2'-disulfonate
(III-11) Disodium 4,4'-bis(4,6-dimercaptopyrimidine-2-ylamino)biphenyl-2,2-disulfonate
(III-12) Disodium 4,4'-bis(4,6-dianilinotriazine-2-ylamino)stilbene-2,2'-disulfonate
(III-13) Disodium 4,4'-bis(4-anilino-6-hydroxytriazine-2-ylamino)stilbene-2,2'-disulfonate
(III-14) Disodium 4,4'-bis(4-naphthylamino-6-anilino-triazine-2-ylamino)stilbene-2,2'-disulfonate
(III-15) 4,4'-Bis[2,6-di(2-naphthoxy)pyrimidine-2-ylamino]stilbene-2,2'-disulfonic acid
(III-16) Disodium 4,4'-bis[2,6-di(2-naphthylamino)-pyrimidine-4-ylamino]stilbene-2,2'-disulfonate
(III-17) Disodium 4,4'-bis(2,6-dianilinopyrimidine-4-ylamino)stilbene-2,2'-disulfonate
(III-18) 4,4'-Bis[2-naphthylamino-6-anilinopyrimidine-4-ylamino]stilbene-2,2'-disulfonic acid
(III-19) Ditriethylammonium 4,4'-bis[2,6-diphenoxypyrimidine-4-ylamino]stilbene-2,2'-disulfonate
(III-20) Disodium 4,4'-bis[2,6-di(benzimidazolyl-2-thio)pyrimidine-4-ylamino]stilbene-2,2'-disulfonate The compounds represented by formula (III) are known compounds, or they can be prepared easily using known methods.

The compounds represented by formula (III) which can be used in the present invention can be used in the form of mixtures of two or more types of compound. The compounds represented by formula (III) are advantageously used in an amount of from about 0.01 gram to about 5 grams per mol of silver halide in the emulsion.

The proportion (by weight) of the infrared sensitizing dye and the compound represented by formula (III) used is such that the value of the ratio (sensitizing dye/compound represented by formula (III)) is from 1/1 to 1/200, and preferably from 1/2 to 1/50.

The compounds represented by formula (III) which can be used in the present invention can be dispersed directly in the emulsion, or they can be added to the emulsion after dissolution in a suitable solvent (for example, methyl alcohol, ethyl alcohol, methyl cellosolve, water etc.) or in a mixture of these solvents. They can also be added to an emulsion in the form of a solution or of a dispersion in a colloid in accordance with the methods described above for the addition of sensitizing dyes. Furthermore, they can be dispersed in and added to the emulsion using the method disclosed in JP-A-50-80119.

Other sensitizing dyes can be used in combination with the infrared sensitizing dyes represented by formula (Ia) or (Ib) in accordance with the present invention. For example, use can be made of the sensitizing dyes disclosed, for example, in U.S. Pat. Nos. 3,703,377, 2,688,545, 3,397,060, 3,615,635 and 3,628,964, British Patents 1,242,588 and 1,293,862, JP-B-43-4936, JP-B-44-14030, JP-B-43-10773, U.S. Pat. No. 3,416,927, JP-B-43-4930, and U.S. Pat. Nos. 3,615,613, 3,615,632, 3,617,295 and 3,635,721.

The silver halide which is used in the present invention may be, for example, silver chloride, silver bromide, silver iodide, silver chlorobromide, silver chloroiodide, silver iodobromide or silver chloroiodobromide. The use of silver chloroiodobromide, silver chlorobromide and silver iodobromide from among the above mentioned silver halides is preferred in the present invention. The use of silver chlorobromide, silver chloroiodobromide or silver chlorobromide which contain from 0 to 1 mol % of silver iodide is especially desirable.

These emulsions may have coarse grains, fine grains, or a mixture of fine and coarse grains, and the silver halide grains may be formed using known methods, such as the single jet method, the double jet method or the controlled double jet method, for example.

Moreover, the crystal structure of the silver halide grains may be uniform into the interior part, or the inner and outer parts may be constructed of layers which have different natures, or the grains may have a so-called core/shell type structure as disclosed in British Patent 635,841 and U.S. Pat. No. 3,622,318. Furthermore, the grains may be of the type in which the latent image is formed principally on the surface or of the internal latent image type in which the latent image is formed inside the grains. These photographic emulsions can be prepared using various generally recognized methods, such as the ammonia method, the neutral method and the acidic method as described, for example, by Mees, *The Theory of the Photographic Process*, published by MacMillan, and by Glafkides in *Photographic Chemistry*, published by the Fountain Press, and as disclosed in *Research Disclosure* Vol. 176 (December 1978) No. 17643.

The average size of the silver halide grains (the number average, measured using the projected area method) is preferably from about 0.04 $\mu$ to about 4 $\mu$, and a grain size of not more than 0.7 $\mu$ is especially desirable.

In cases where high contrast photographic characteristics are required, such as in the case of materials which are to be used in plate making applications, the use of a silver halide emulsion in which the grain size has a so-called mono-dispersion is preferred. Here, the term "mono-dispersion" signifies that the variation coefficient of the grain size is not more than 20%, and preferably not more than 15%.

Furthermore, when forming continuous tone images, emulsions are required to have a softer gradation as photographic characteristics and in this case the use of a poly-disperse emulsion, or the use of a mixture of two or more mono-disperse emulsions which have different average grain sizes, is preferred. Silver halide solvents, for example, ammonia, potassium thiocyanate, ammonium thiocyanate, thioether compounds (for example, as disclosed in U.S. Pat. Nos. 3,271,157, 3,574,628, 3,704,130, 4,297,439 and 4,276,374), thione compounds (for example, as disclosed in JP-A-53-144319, JP-A-53-82408 and JP-A-55-77737) and amine compounds (for example, as disclosed in JP-A-54-100717), can be used to control grain growth during the formation of the silver halide grains.

Furthermore, water soluble rhodium and/or water soluble iridium can be added during the formation of the silver halide grains or before or after the formation of the grains.

The methods of chemical sensitization normally used, such as gold sensitization (for example, as disclosed in U.S. Pat. Nos. 2,540,085, 2,597,876, 2,597,915 and 2,399,083), sensitization with group VII metal ions (for example, as disclosed in U.S. Pat. Nos. 2,448,060, 2,540,086, 2,566,245, 2,566,263 and 2,598,079), sulfur sensitization (for example, as disclosed in U.S. Pat. Nos. 1,574,944, 2,278,947, 2,440,206, 2,521,926, 3,021,215, 3,038,805, 2,410,689, 3,189,458, 3,415,649 and 3,635,717), reduction sensitization (for example, as disclosed in U.S. Pat. Nos. 2,518,698, 2,419,974 and 2,983,610, and Research Disclosure, Volume 176 (December 1978) No. 17643, Section III), sensitization with thioether compounds (for example, as disclosed in U.S. Pat. Nos. 2,521,926, 3,021,215, 3,038,805, 3,046,129, 3,046,132, 3,046,133, 3,046,134, 3,046,135, 3,057,724, 3,062,646, 3,165,552, 3,189,458, 3,192,046, 3,506,443, 3,671,260, 3,574,709, 3,625,697, 3,635,717 and 4,198,240), and combinations of these methods can be applied to the silver halide emulsions.

Moreover, specific examples of chemical sensitizing agents include sulfur sensitizing agents such as allyl thiocarbamide, thiourea, sodium thiosulfate, thioethers and cysteine; noble metal sensitizing agents such as potassium chloroaurate, aurous thiosulfate and potassium chloropalladate; and reduction sensitizing agents such as tin chloride, phenylhydrazine and reductone.

Other sensitizing agents such as polyoxyethylene derivatives (for example, as disclosed in British Patent 981,470, JP-B-31-6475 and U.S. Pat. No. 2,716,062), polyoxypropylene derivatives, and derivatives based on quaternary ammonium groups can also be included.

Various compounds can be added to the emulsions of the present invention in order to prevent loss of photographic speed, or fogging, during the manufacture, storage or processing of the photosensitive material. A great many compounds of this type, including heterocyclic compounds, mercury-containing compounds, mercapto compounds and metal salts, such as nitrobenzimidazole, ammonium chloroplatinate, 4-hydroxy-6-methyl-1,3,3a,7-tetraazaindene and 1-phenyl-5-mercaptotetrazole, have long been known. Examples of compounds which can be used for this purpose have been described by K. Mees on pages 344 to 439 of the text book entitled *The Theory of the Photographic Process* (Third Edition, 1966). Other compounds include the thiazolium salts disclosed, for example, in U.S. Pat. Nos. 2,131,038 and 2,694,716, the azaindenes disclosed, for example, in U.S. Pat. Nos. 2,886,437 and 2,444,605, the urazoles disclosed, for example, in U.S. Pat. No. 3,287,135, the sulfocatechols disclosed, for example, in U.S. Pat. No. 3,236,652, the oximes disclosed, for example, in British Patent 623,448, the mercaptotetrazoles, nitrone and nitroindazoles disclosed, for example, in U.S. Pat. Nos. 2,403,927, 3,266,897 and 3,397,987, the polyvalent metal salts disclosed, for example, in U.S. Pat. No. 2,839,405, the thiuronium salts disclosed, for example, in U.S. Pat. No. 3,220,839, and the palladium, platinum and gold salts disclosed, for example, in U.S. Pat. Nos. 2,566,263 and 2,597,915.

The silver halide photographic emulsions may contain developing agents, for example, hydroquinones; catechols; aminophenols; 3-pyrazolidones; ascorbic acid and derivatives thereof; reductones and phenylenediamines; or combinations of these developing agents. The developing agents can be introduced into the silver halide emulsion layers and/or other photographic layers (for example, protective layers, interlayers, filter layers, anti-halation layers and backing layers). The developing agents can be dissolved in an appropriate solvent, or they may be added in the form of a dispersion as disclosed, for example, in U.S. Pat. No. 2,592,368 or French Patent 1,505,778.

The compounds disclosed, for example, in U.S. Pat. Nos. 3,288,612, 3,333,959, 3,345,175 and 3,708,303, British Patent 1,098,748, and West German Patents 1,141,531 and 1,183,784 can be used as development accelerators.

Emulsion film hardening treatments can be executed using normal methods. Examples of hardening agents which can be used for this purpose include aldehydes such as formaldehyde and glutaraldehyde; ketones such as diacetyl and cyclopentanedione; reactive halogen-containing compounds such as bis(2-chloroethylurea), 2-hydroxy-4,6-dichloro-1,3,5-triazine and the other compounds disclosed, for example, in U.S. Pat. Nos. 3,288,775 and 2,732,303, and British Patents 974,723 and 1,167,207;,, reactive olefin-containing compounds such as divinylsulfone,5-acetyl-1,3-diacryloylhexahydro-1,3,5-triazine and the other compounds disclosed, for example, in U.S. Pat. Nos. 3,635,718 and 3,232,763, and British Patent 994,869; N-methylol compounds such as N-hydroxymethylphthalimide and the other compounds disclosed, for example, in U.S. Pat. Nos. 2,732,316 and 2,586,168; isocyanate compounds such as those disclosed, for example, in U.S. Pat. No. 3,103,437; aziridine compounds such as those disclosed, for example, in U.S. Pat. Nos. 3,017,280 and 2,983,611; acid derivatives such as those disclosed, for example, in U.S. Pat. Nos. 2,725,294 and 2,725,295; carboxyimide based compounds such as those disclosed, for example, in U.S. Pat. No. 3,100,704; epoxy compounds such as those disclosed, for example, in U.S. Pat. No. 3,091,537; isoxazole based compounds such as those disclosed, for example, in U.S. Pat. Nos. 3,321,313 and 3,543,292; halogenocarboxyaldehydes such as mucochloric acid; dioxane derivatives such as dihydroxydioxane and dichlorodioxane; and inorganic film hardening agents such as chrome alum and zirconium sulfate. Furthermore, precursor forms can be used in place of the compounds described above. For example, alkali metal bisulfite aldehyde adducts, methylol derivatives of hydantoin and primary aliphatic nitroalcohols can be used for this purpose.

Surfactants can be added individually, or in combinations, to the photographic emulsions of the present invention.

These surfactants are used as coating promotors, but they can also be used for other purposes, for example, for emulsification and dispersion purposes, for improving sensitizing photographic characteristics, for antistatic purposes, and for the prevention of adhesion. These surfactants include natural surfactants such as saponin; non-ionic surfactants such as alkylene oxide based surfactants; glycerin based surfactants and glycidol based surfactants, cationic surfactants such as higher alkylamines, quaternary ammonium salts, pyridine and other heterocyclic compounds, and phosphonium or sulfonium compounds; anionic surfactants which contain acidic groups, such as carboxylic acids, sulfonic acid, phosphoric acid, sulfuric acid esters and phosphoric acid esters; and amphoteric surfactants such as amino acids, aminosulfonic acids and sulfates and phosphates of aminoalcohols.

In addition to gelatin, acylated gelatins such as phthalated gelatins and malonated gelatins; cellulose compounds such as hydroxyethyl cellulose and carboxymethyl cellulose; soluble starches such as dextrin; and hydrophilic polymers such as poly(vinyl alcohol), polyvinylpyrrolidone, polyacrylamide and poly(styrenesulfonic acid) can be used as protective colloids in the silver halide photographic emulsions which are used in the present invention.

Condensation products of poly(alkylene oxide) compounds, for example, alkylene oxides which have from 2 to 4 carbon atoms, such as ethylene oxide, propylene-1,2-oxide, butylene-1,2-oxide, and preferably a poly(alkylene oxide) containing at least 10 ethylene oxide units, with compounds which have at least one active hydrogen atom, for example, water, aliphatic alcohols, aromatic alcohols, fatty acids, organic amines and hexitol derivatives, and block copolymers of two or more types of poly(alkylene oxide), can be used in the present invention. That is to say, use can be made of the specific examples indicated below as poly(alkylene oxide) compounds:

Polyalkylene glycols
Polyalkylene glycol alkyl ethers
Polyalkylene glycol aryl ethers
Polyalkylene glycol alkylaryl ethers
Polyalkylene glycol esters
Polyalkylene glycol aliphatic amides
Polyalkylene glycol amines
Polyalkylene glycol block copolymers
Polyalkylene glycol graft polymers The molecular weight must be at least 600.

The number of poly(alkylene oxide) chains in the molecule is not limited to one, and two or more such chains may be present. In this case, the individual poly(alkylene oxide) chains may consist of less than 10 alkylene oxide units, but the total number of alkylene oxide units in the molecule must be at least 10. In cases where there are two or more poly(alkylene oxide) chains in the molecule, these chains may be comprised of different alkylene oxide units, for example, they may be formed from ethylene oxide and propylene oxide. The poly(alkylene oxide) compounds which can be used in the present invention preferably contain at least 14, and up to 100, alkylene oxide units.

Specific examples of poly(alkylene oxide) compounds which can be used in the present invention include those disclosed in JP-A-50-156423, JP-A-52-108130 and JP-A-53-3217. These poly(alkylene oxide) compounds can be used individually, or combinations of two or more types can be used.

In those cases where these poly(alkylene oxide) compounds are added to the silver halide emulsion layer, the addition can be made by dissolving the compound at a suitable concentration in water or in a low boiling point organic solvent which is miscible with water and adding the solution to the emulsion at a suitable point in time, preferably after chemical sensitization, and prior to coating. The amount of poly(alkylene oxide) compound which can be used in the practice of the present invention is preferably within the range from $1 \times 10^{-5}$ mol to $1 \times 10^{-2}$ mol.

Polymer latexes comprising homopolymers or copolymers of, for example, alkyl acrylates, alkyl methacrylates, acrylic acid, gylcidyl acrylate, as disclosed, for example, in U.S. Pat. Nos. 3,411,911, 3,411,912, 3,142,568, 3,325,286 and 3,547,650, and JP-B-45-5331, can be included with a view to improving the dimensional stability of the photographic material or improving film properties.

The silver halide photographic emulsions can also contain anti-static agents, plasticizers, fluorescent whiteners, anti-aerial foggants and toners, for example.

Furthermore, the dyes disclosed, for example, in JP-B-41-20389, JP-B-43-3504, JP-B-43-13168, U.S. Pat. Nos. 2,697,037, 3,423,207 and 2,865,752, and British Patents 1,030,392 and 1,100,546 can be used as anti-irradiation dyes which are included as required.

The present invention can, of course, be used for the sensitization of black-and-white emulsions and it can also be used for the sensitization of silver halide emulsions which are used in a variety of color photosensitive materials.

Various color couplers, can be used in the present invention. Here, the term "color coupler" signifies a compound which can undergo a coupling reaction with the oxidized form of a primary aromatic amine developing agent and form a dye. Naphthol and phenol based compounds, pyrazolone and pyrazoloazole based compounds, and open chain or heterocyclic ketomethylene compounds are typical examples of useful color couplers. Specific examples of the cyan, magenta and yellow couplers which can be used in the present invention have been disclosed in the patents cited in *Research Disclosure*, No. 17643 (December 1978), section VII-D, and ibid, No. 18717 (November 1979)

The colored couplers which can be incorporated into the photosensitive materials are preferably rendered non-dispersible by having ballast groups or by polymerization. Two-equivalent color couplers which are substituted with a split-off group at the active coupling position are preferred over four-equivalent couplers which have a hydrogen atom at the active coupling position in view of the fact they enable the amount of silver coated to be reduced. Couplers of which the colored dye has a suitable degree of diffusibility, non-color forming couplers or DIR couplers which release development inhibitors as the coupling reaction proceeds, or couplers which release development accelerators as the coupling reaction proceeds, can also be used.

The oil protected type acylacetamide based couplers are typical of the yellow couplers which can be used in the present invention. Specific examples have been disclosed, for example, in U.S. Pat. Nos. 2,407,210, 2,875,057 and 3,265,506. The use of two-equivalent yellow couplers is preferred in the present invention, and typical examples include the oxygen atom releasing type yellow couplers disclosed, for example, in U.S. Pat. Nos. 3,408,194, 3,447,928, 3,933,501 and 4,022,620, and the nitrogen atom elimination type yellow couplers disclosed, for example, in JP-B-55-10739, U.S. Pat. Nos. 4,401,752 and 4,326,024, RD No. 18053 (April 1979), British Patent 1,425,020, and West German Patent Application (OLS) Nos. 2,219,917, 2,261,361, 2,329,587 and 2,433,812. Moreover, α-pivaloylacetanilide based couplers provide dyes which have excellent fastness, especially light fastness, and α-benzoylacetanilide based couplers provide high color densities, and are preferably used.

Oil protected type indazolone based or cyanoacetyl based, and preferably 5-pyrazolone based and pyrazoloazole, for example, pyrazolotriazole, based, couplers can be used as the magenta couplers which are used in the present invention. The 5-pyrazolone based couplers are preferably couplers which have an arylamino group or an acylamino group substituted in the 3-position from the point of view of the hue of the dye which is formed and the color density, and typical examples have been disclosed, for example, in U.S. Pat. Nos. 2,311,082, 2,343,703, 2,600,788, 2,908,573, 3,062,653, 3,152,896 and 3,936,015. The nitrogen atom split-off groups disclosed in U.S. Pat. No. 4,310,619 or the arylthio groups disclosed in U.S. Pat. No. 4,351,897 are the preferred split-off groups for two-equivalent 5-pyrazolone based couplers. Furthermore, the 5-pyrazolone based couplers which have ballast groups disclosed in European Patent 73,636 provide high color densities. The pyrazolobenzimidazoles disclosed in U.S. Pat. No. 3,061,432, and especially the pyrazolo-[5,1-c][1,2,4]triazoles disclosed in U.S. Pat. No. 3,725,067, the pyrazolotetrazoles disclosed in *Research Disclosure*, No. 24220 (June 1984) and JP-A-60-33552, and the pyrazolopyrazoles disclosed in *Research Disclosure*, No. 24230 (June 1984) and JP-A-60-43659 are preferred as pyrazoloazole based couplers. The imidazo[1,2-b]pyrazoles disclosed in U.S. Pat. No. 4,500,630 are preferred in view of the slight absorbance on the yellow side and the light fastness of the colored dye, and the pyrazolo[1,5-b][1,2,4]triazoles disclosed in U.S. Pat. No. 4,540,654 are especially desirable. The oil protected type naphthol based and phenol based couplers can be used as cyan couplers in the present invention, and typical examples include the naphthol based couplers disclosed in U.S. Pat. No. 2,474,293 and, preferably, the oxygen atom releasing type two-equivalent naphthol based couplers disclosed in U.S. Pat. Nos. 4,052,212, 4,146,396, 4,228,233 and 4,296,200. Furthermore, specific examples of phenol based couplers have been disclosed, for example, in U.S. Pat. Nos. 2,369,929, 2,801,171, 2,772,162 and 2,895,826.

The use of cyan couplers which are fast to moisture and temperature is preferred in this invention, and typical examples of such couplers include the phenol based cyan couplers which have an alkyl groups comprising an ethyl or larger group in the meta position of the phenol ring disclosed in U.S. Pat. No. 3,772,002, the 2,5-diacylamino substituted phenol based couplers disclosed, for example, in U.S. Pat. Nos. 2,772,162, 3,758,308, 4,126,396, 4,334,011 and 4,327,173, West German Patent Application (OLS) No. 3,329,729, and European Patent 121,365, and the phenol based couplers which have a phenylureido group in the 2-position and an acylamino group in the 5-position disclosed, for example, in U.S. Pat. Nos. 3,446,622, 4,333,999, 4,451,559 and 4,427,767. The cyan couplers which have a sulfonamido group or an amido group, substituted in the 5-position of the naphthol ring disclosed in JP-A-60-237448, JP-A-61-153640 and JP-A-61-145557 provide color images which have superior fastness and their use is preferred in the present invention.

The conjoint use of colored couplers for correcting the unwanted absorptions on the short wavelength side of the dyes formed from magenta and cyan couplers is preferred in camera color negative sensitive materials. Typical examples include the yellow colored magenta couplers disclosed, for example, in U.S. Pat. No. 4,163,670 and JP-B-57-39413, and the magenta colored cyan couplers disclosed, for example, in U.S. Pat. Nos. 4,004,929 and 4,138,258 and British Patent 1,146,368.

Graininess can be improved by the conjoint use of couplers of which the colored dyes have suitable diffusibility. Specific examples of couplers of this type include the magenta couplers disclosed in U.S. Pat. No. 4,366,237 and British Patent 2,125,570, and the yellow, magenta and cyan couplers disclosed in European Patent 96,570 and West German Patent Application (OLS) No. 3,234,533.

The dye forming couplers and the above mentioned special couplers can take the form of dimers or larger polymers. Typical examples of polymerized dye forming couplers have been disclosed in U.S. Pat. Nos. 3,451,820 and 4,080,211. Specific examples of polymerized magenta couplers have been disclosed in British Patent 2,102,173, U.S. Pat. No. 4,367,282 and JP-A-61-232455.

Two or more of the various types of coupler used in the present invention can be used conjointly in a layer of the same color sensitivity, and the same compound can be used in two or more different layers, in order to satisfy the characteristics required of the photosensitive material.

Moreover, dye providing compounds which are used in color diffusion transfer methods or heat development type color diffusion transfer methods can also be included in the photosensitive materials of the present invention. The compounds indicated below can be used as such dye providing compounds.

(1) Dye developing agents in which a dye component is linked with a hydroquinone based developing agent, as disclosed, for example, in U.S. Pat. Nos. 3,134,764, 3,362,819, 3,597,200, 3,544,545 and 3,482,972. These dye developing agents are diffusible in an alkaline environment but become non-diffusible on reaction with a silver halide.

(2) The non-diffusible compounds which release diffusible dyes under alkaline conditions but which lose this capability on reaction with silver halide as disclosed in U.S. Pat. No. 4,503,137 can also be used. Examples include the compounds which release diffusible dyes by means of an intramolecular nucleophilic displacement reaction disclosed in U.S. Pat. No. 3,980,479 and the compounds which release diffusible dyes by means of an intramolecular rearrangement reaction of an isoxazolone as disclosed, for example, in U. S. Pat. No. 4,199,354.

(3) The non-diffusible compounds which react with the residual reducing agents which are not oxidized by development and release diffusible dyes as disclosed, for example, in U.S. Pat. No. 4,559,290, European Patent 220,746A2, and Kokai Giho No. 87-6199 can also be used.

Examples of such compounds include those which release diffusible dyes by means of a post reduction intramolecular nucleophilic displacement reaction disclosed, for example, in U.S. Pat. Nos. 4,139,389 and 4,139,379, JP-A-59-185333 and JP-A-57-84453, those which release diffusible dyes by means of a post reduction intramolecular electron transfer reaction disclosed, for example, in U.S. Pat. No. 4,232,107, JP-A-59-101649, JP-A-61-88257 and in *Research Disclosure*, No. 24025 (1984), those which release diffusible dyes by post reduction single bond cleavage as disclosed in West German Patent 3,008,588A, JP-A-56-142530 and U.S.

Pat. Nos. 4,343,893 and 4,619,884, the nitro compounds which release diffusible dyes after accepting an electron as disclosed in U.S. Pat. No. 4,450,223, and those which release diffusible dyes after accepting an electron disclosed in U.S. Pat. No. 4,609,610.

Furthermore, the inclusion of the compounds which have an N—X bond (where X represents an oxygen, sulfur or nitrogen atom) and an electron withdrawing group in the same molecule disclosed, for example, in European Patent 220,746A2, Kokai Giho No. 87-6199, JP-A-63-201653 and JP-A-63-201654, the compounds which have an $SO_2$—X bond (where X has the same significance as above) and an electron withdrawing group in the same molecule as disclosed in U.S. patent application Ser. No. 07/188,779, the compounds which have a PO—X bond (where X has the same significance as above) and an electron withdrawing group in the same molecule as disclosed in JP-A-63-271344, and the compounds which have a C—X' bond (where X' has the same significance as X above or represents an —$SO_2$— group) and an electron withdrawing group in the same molecule as disclosed in JP-A-63-271341 is preferred.

The use of the compounds which have an N—X bond and an electron withdrawing group in the same molecule is preferred from among these compounds. Specific examples include, for example, the compounds (1)-(3), (7)-(10), (13), (15), (23)-(26), (31), (32), (35), (36), (40), (41), (44), (53)-(59), (64) and (71) disclosed in European Patent 220,746A2, and the compounds (11)-(23) disclosed in Kokai Giho No. 87-6199.

(4) Compounds which are couplers which have diffusible dyes in the split-off group, and which release diffusible dyes by reaction with the oxidized form of a reducing agent (DDR couplers). Specific examples have been disclosed, for example, in British Patent 1,330,524, JP-B-48-39165 and U.S. Pat. Nos. 3,443,940, 4,474,867 and 4,483,914.

(5) Compounds which are reducing with respect to silver halide or organic silver salts and which release diffusible dyes when reduction occurs (DRR compounds). These compounds cannot be used when another reducing agent is used and so there are undesirable problems with image staining due to the oxidative degradation of the reducing agents.

Typical examples have been disclosed, for example, in U.S. Pat. Nos. 3,928,312, 4,053,312, 4,055,428 and 4,336,322, JP-A-59-65839, JP-A-59-69839, JP-A-53-3819, JP-A-51-104343, Research Disclosure, No. 17465, U.S. Pat. Nos. 3,725,062, 3,728,113, 3,443,939, JP-A-58-116537, JP-A-57-179840 and U.S. Pat. No. 4,500,626. The compounds disclosed in columns 22 to 44 of the aforementioned U.S. Pat. No. 4,500,626 can be cited as specific examples of DRR compounds, and of these compounds the use of those designated therein as numbers (1)-(3), (10)-(13), (16)-(19), (28)-(30), (33)-(35), (38)-(40) and (42)-(64) are preferred. Furthermore, the compounds disclosed in columns 37 to 39 of U.S. Pat. No. 4,639,408 are also useful.

Dye-silver compounds in which organic silver salts are bonded to dyes (for example, as disclosed *Research Disclosure*, May 1978, pages 54–58), azo dyes which can be used in a heat development silver dye bleach method (for example, as disclosed in U.S. Pat. No. 4,235,957 and *Research Disclosure*, April 1976, pages 30–32) and leuco dyes (for example, as disclosed in U.S. Pat. Nos. 3,985,565 and 4,022,617) can also be used for this purpose.

The present invention can be applied to a variety of color photosensitive materials. For example, it can be applied to color photosensitive materials which have at least three photosensitive layers which form cyan, magenta and yellow colored images respectively and in which at least one of these layers is spectrally sensitized to infrared light as disclosed, for example, in JP-A-59-180553 and JP-A-62-295048, and color photosensitive materials in which at least two of the three types of photosensitive layer above mentioned are spectrally sensitized to infrared light, as disclosed in JP-A-61-137149.

The exposure for obtaining a photographic image can be carried out using normal methods. That is to say, the exposure can be made using various known light sources which contain infrared light, such as natural light (sunlight), tungsten lamps, mercury vapor lamps, xenon arc lamps, cathode ray tube flying spots, light emitting diodes and laser light (for example, gas lasers, YAG lasers, dye lasers, semiconductor lasers). Furthermore, exposures can also be made using the light released from phosphors which have been excited with electron beams, X-rays, $\gamma$-rays or $\alpha$-rays, for example. The normal range of exposure times ranging from $1/1000^{th}$ of a second to 1 second as used in a normal camera can of course be used, and exposures shorter than $1/1000^{th}$ of a second, such as exposures made using a xenon strobe light or a cathode ray tube with an exposure time of from $10^{-4}$–$10^{-8}$ second, and exposures of longer duration than 1 second, can also be used. The spectral composition of the light which is used for the exposure can be adjusted with filters, as required.

In those cases where the invention is applied to color photosensitive materials in which use is made of the subtractive or additive color methods and in which all of the three primary color forming layers are spectrally sensitized to different wavelengths in the infrared region, it is possible to make an exposure using only infrared rays. For example, in such a case scanning exposures can be made using three types of semiconductor laser which have emissions of the respective wavelengths.

On the other hand, in those cases where one or two of the color forming layers are sensitive to shorter wavelengths than the infrared region, exposures can be made using an infrared light source and a light source of shorter wavelength. The light source which has a shorter wavelength may in fact emit light of a shorter wavelength or use can be made of light from a long wavelength light source such as a semiconductor laser which has been shortened in wavelength using an SHG element.

The silver halide emulsions are coated on a support together with other photographic layers as required. Thus, they can be coated using various coating methods including dip coating, air knife coating, curtain coating or extrusion coating using a hopper, as disclosed in U.S. Pat. No. 2,681,294.

Two or more layers may be coated at the same time, as required, using the methods disclosed, for example, in U.S. Pat. Nos. 2,761,791, 3,508,947, 2,941,898 and 3,526,528.

The finished emulsion is coated onto an appropriate support. The support is a flat substance which is not liable to pronounced dimensional changes during processing, being a hard support such as glass, metal or ceramic, or a flexible support, as required. Typical examples of flexible supports include the cellulose nitrate films, cellulose acetate films, cellulose acetate butyrate films, cellulose acetate propionate films, polystyrene films, poly(ethylene terephthalate) films, polycarbonate films, laminates of these materials with other materials, thin glass films, and papers which are normally used in photographic photosensitive materials. Papers which have been coated or laminated with baryta or α-olefin polymers, and especially polyethylene, polypropylene and ethylene/butene copolymers for example, polymers of α-olefins which have from 2 to 10 carbon atoms, and supports such as plastic films of which the adhesion with other polymeric substances has been improved by roughening the surface as disclosed in JP-B-47-19068 and which are suitable for printing can also be used to good effect.

A transparent or non-transparent support is selected according to the purpose of the photosensitive material. In the case of a transparent support it need not be a colorless support, and colored transparent supports can be obtained by the addition of dyes and pigments. This technique has long been used for X-ray films, for example, and it has been described, for example, in *J. SMPTE*, volume 67, page 296 (1958).

As well as the original non-transparent supports such as paper, non-transparent supports include supports obtained by adding dyes and pigments, such as titanium oxide, to transparent films, plastic films which have been subjected to a surface treatment as disclosed in JP-B-47-19068, and papers and plastic films which have been rendered completely opaque to light by the addition of carbon black and dyes, for example. A layer which has adhesive properties can be established as a subbing layer in cases where the strength of adhesion between the support and the photographic emulsion layer is inadequate. Furthermore, the surface of the support can be pre-treated with a corona discharge, by irradiation with ultraviolet light, or by means of a flame treatment, for example, in order to improve adhesion properties.

Any of the known methods can be used for the photographic processing of photosensitive materials of the present invention. The known processing baths can be used. The processing temperature is normally selected between 18° C. and 50° C., but temperatures below 18° C. and in excess of 50° C. can be used. Development processing for the formation of a silver image (black-and-white processing) or color processing, including development processing for the formation of a dye image, can be used, according to the intended purpose of the processing.

Phenidone-hydroquinone and metol-hydroquinone development and methods in which lith type silver halide photosensitive materials formed from silver bromide are processed in hydroquinone developers (lith developers) which have a very low sulfite ion concentration (not more than 0.1 mol/liter), systems in which high contrast images are obtained by using developers which have a fairly high sulfite ion concentration (at least 0.2 mol/liter), a high pH (10.5 or more), and which contain nitroindazole based compounds are used as hydroquinone development baths for the above mentioned lith type silver halide sensitive materials (disclosed in JP-A-58-190943), methods in which high contrast is achieved by processing photosensitive materials which contain tetrazolium compounds in a PQ type or MQ type development bath which contains a comparatively high concentration of sulfite (disclosed, for example, in JP-A-52-18317, JP-A-53-17719 and JP-A-53-17720) and the methods in which ultra-high contrast negative images with a gamma value in excess of 10 are obtained by processing surface latent image type silver halide photographic materials to which specified acylhydrazine compounds have been added in a development bath at pH 11.0–12.3 which contains at least 0.15 mol/liter of sulfite preservative and which has good storage properties, as disclosed in U.S. Pat. Nos. 4,166,742, 4,168,977, 4,221,857, 4,224,401, 4,243,739, 4,272,606 and 4,311,781, can all be used for black-and-white processing.

More precisely, development processing can be carried out using the methods disclosed in *Research Disclosure*, Volume 176, No. 17643, page 28–29, and ibid, Volume 187, No. 18716, left and right hand columns on page 651.

The organic sulfur compounds which are known to be effective as fixing agents can be used as well as thiosulfates and thiocyanates as fixing agents.

Water soluble aluminum salts can be included in the fixing baths as film hardening agents.

The usual methods can be used in cases where dye images are formed. Thus, the negative/positive method (for example, as disclosed in *Journal of the Society of Motion Picture and Television Engineers*, Volume 61 (1953), pages 667–701), the color reversal method in which a positive dye image is obtained by forming a negative silver image by development in a development bath which contains a black-and-white developing agent, subjecting the material to at least one uniform exposure or a suitable fogging process and then carrying out color development, and silver dye bleach methods in which a photographic emulsion layer which contains dyes is developed to form a silver image and the dyes are then bleached using the silver image as a bleaching catalyst, can be used.

Details of these color developing agents have been described, for example, by L.F.A. Mason in *Photographic Processing Chemistry*, pages 226–229 (published by the Focal Press, London, 1966). Further, they can be used in combination with 3-pyrazolidones.

Various additives can be added to the color development bath, as required.

The silver halide photographic emulsions can be fixed in the usual way after development, but a bleaching process preferably is carried out in certain cases. The bleaching process can be carried out at the same time as fixing, or it can be carried out separately. A bleach-fix bath to which a bleaching agent and a fixing agent have been added is used when bleaching and fixing are carried out simultaneously.

The invention can also be applied to low silver content photosensitive materials in which the silver halide content in the emulsion is from a few percent to about 1 percent of that in an ordinary photosensitive material.

The invention can also be applied to photosensitive materials which are developed by heat.

Literature in which specific examples of heat developable photosensitive materials in which the present invention can be used, and in which the dye fixing materials and methods of development are described, is indicated below: U.S. Pat. Nos. 4,463,079, 4,474,867, 4,478,927, 4,507,380, 4,500,626 and 4,438,914, JP-A-58-149046, JP-A-58-149047, JP-A-59-152440, JP-A-59-154445, JP-A-59-165054, JP-A-59-180548, JP-A-59-168439, JP-A-59-174832, JP-A-59-174833, JP-A-59-174834, JP-A-59-174835, JP-A-62-65038, JP-A-61-

23245, and European Patents 210,606A2 and 220,746A2.

PREFERRED EMBODIMENTS OF THE INVENTION (1) Silver halide photographic materials within the scope of the invention in which $Z_1$ in formula (Ia) is a thiazole nucleus, a selenazole nucleus or an oxazole nucleus.

(2) Silver halide photographic materials as in embodiment (1) wherein $Z_1$ in formula (Ia) is a benzothiazole nucleus, naphthothiazole nucleus, benzoselenazole nucleus, naphthoselenazole nucleus or naphthoxazole nucleus.

(3) Silver halide photographic materials within the scope of the invention in which Y in formula (IIa) or (IIb) is a sulfur atom or a selenium atom.

(4) Silver halide photographic materials within the scope of the invention in which a compound which can be represented by formula (III) is included in combination with a sensitizing dye of formula (Ia) or (Ib) and a compound of formula (IIa) or [IIb].

The invention is described by means of illustrative examples below, but the invention is not limited to just these examples.

EXAMPLE 1

Silver halide grains were precipitated using the double jet method and subjected to physical ripening and a desalting treatment, after which they were subjected to chemical ripening to provide a silver iodobromide emulsion (silver iodide content 1.5 mol %). The average size of the silver halide grains contained in this emulsion was 0.4 μm. One kilogram of the emulsion contained 0.65 mol of silver halide.

This emulsion was divided into 1 kg portions and, after heating and melting at 40° C., a methanol solution of sensitizing dyes included in formula (Ia) and compounds included in formula (IIa) or (IIb) was added in the prescribed quantity, as indicated in Table 1 below, 15 ml of a 1% methanol solution of compound (III-3) was added, and the resulting mixtures were stirred. Next, 28 ml of a 1.0 wt % aqueous solution of 1-hydroxy-3,5-dichlorotriazine sodium salt was added, 40 ml of a 1.0 wt % aqueous solution of sodium dodecylbenzenesulfonate was added and an ethyl acrylate polymer latex was added to improve the film properties, and the mixture was stirred. The finished emulsions were then coated onto a cellulose triacetate film base in such a way as to provide a dry film thickness of 5 microns, and a solution obtained by adding sodium dodecylbenzenesulfonate as a surfactant and silica and poly(methyl acrylate) polymer as matting agents to an aqueous gelatin solution was coated over the top as a protective layer and dried to provide samples.

The film samples so obtained were subjected to an optical wedge exposure using a densitometer which had a light source of color temperature 2854° K. fitted with a dark red filter (SC-70) made by the Fuji Photo Film Co., Ltd. After exposure, the samples were developed using a development bath the composition of which is indicated below for a period of 3 minutes at 20° C., stopped and fixed in a fixer bath, after which they were washed with water and strips which had the prescribed black-and-white image were obtained. Density measurements were made using a P-type densitometer made by the Fuji Photo Film Co., Ltd., and the photographic speed and fog values were obtained. The reference point of optical density at which the photographic speed was determined was fog +0.3.

| Development Bath Composition | |
|---|---|
| Water | 500 ml |
| N-Methyl-p-aminophenol | 2.2 grams |
| Anhydrous sodium sulfite | 96.0 grams |
| Hydroquinone | 8.8 grams |
| Sodium carbonate monohydrate | 56.0 grams |
| Potassium bromide | 5.0 grams |
| Water to make up to | 1 liter |

The results obtained are shown in Table 1 as relative values.

It is clear from these results that the compositions of the present invention provided photosensitive materials which had a higher photographic speed and less fog than materials in which the dyes were used alone.

TABLE 1

| No. | SENSITIZING DYE OF FORMULA (Ia) | AMOUNT USED ($\times 10^{-6}$ mol/kg. EMULSION) | COMPOUND | AMOUNT USED (mg/kg. EMULSION) | RELATIVE SPEED | FOG |
|---|---|---|---|---|---|---|
| 1-1 | (Ia-1) | 35 | — | — | 100 STANDARD | 0.08 |
| 1-2 | " | 35 | (IIa-1) | 120 | 229 | 0.08 |
| 1-3 | " | 35 | " | 240 | 302 | 0.07 |
| 1-4 | (Ia-2) | 35 | — | — | 100 STANDARD | 0.08 |
| 1-5 | " | 35 | (IIa-1) | 120 | 251 | 0.07 |
| 1-6 | " | 35 | " | 240 | 398 | 0.07 |
| 1-7 | (Ia-3) | 35 | — | — | 100 STANDARD | 0.08 |
| 1-8 | " | 35 | (IIa-1) | 120 | 204 | 0.08 |
| 1-9 | " | 35 | " | 240 | 295 | 0.07 |
| 1-10 | (Ia-6) | 35 | — | — | 100 STANDARD | 0.08 |
| 1-11 | " | 35 | (IIa-1) | 120 | 214 | 0.07 |
| 1-12 | " | 35 | " | 240 | 263 | 0.07 |
| 1-13 | (Ia-11) | 35 | — | — | 100 STANDARD | 0.08 |
| 1-14 | " | 35 | (IIa-1) | 120 | 245 | 0.07 |
| 1-15 | " | 35 | " | 240 | 372 | 0.07 |
| 1-16 | (Ia-17) | 35 | — | — | 100 STANDARD | 0.08 |
| 1-17 | " | 35 | (IIa-1) | 120 | 219 | 0.08 |
| 1-18 | " | 35 | " | 240 | 316 | 0.07 |

EXAMPLE 2

Samples were obtained in the same way as in Example 1, except that the sensitizing dyes of formula (Ib) shown in Table 2 below, were used in place of the sensitizing dyes of formula (Ia), and the results obtained are shown in Table 2. It is clear that photosensitive materials with a high photographic speed and little fogging were obtained with the combinations of the present invention.

a way as to provide a coated silver weight of 3.7 grams per square meter.

TABLE 2

| No. | SENSITIZING DYE OF FORMULA (Ib) | AMOUNT USED ($\times 10^{-6}$ mol/kg Emul) | COMPOUNDS | AMOUNT USED (mg/kg. Emulsion) | RELATIVE SPEED | FOG |
|---|---|---|---|---|---|---|
| 2-1 | (Ib-1) | 40 | — | — | 100 STANDARD | 0.08 |
| 2-2 | " | 40 | (IIa-2) | 100 | 251 | 0.07 |
| 2-3 | " | 40 | " | 200 | 309 | 0.07 |
| 2-4 | (Ib-3) | 40 | — | — | 100 STANDARD | 0.08 |
| 2-5 | " | 40 | (IIa-2) | 100 | 229 | 0.07 |
| 2-6 | " | 40 | " | 200 | 372 | 0.07 |
| 2-7 | (Ib-6) | 40 | — | — | 100 STANDARD | 0.08 |
| 2-8 | " | 40 | (IIa-2) | 100 | 214 | 0.07 |
| 2-9 | " | 40 | " | 200 | 295 | 0.07 |
| 2-10 | (Ib-9) | 40 | — | — | 100 STANDARD | 0.08 |
| 2-11 | " | 40 | (IIa-2) | 100 | 251 | 0.07 |
| 2-12 | " | 40 | " | 200 | 372 | 0.07 |
| 2-13 | (Ib-15) | 40 | — | — | 100 STANDARD | 0.08 |
| 2-14 | " | 40 | (IIa-2) | 100 | 240 | 0.07 |
| 2-15 | " | 40 | " | 200 | 316 | 0.07 |
| 2-16 | (Ib-18) | 40 | — | — | 100 STANDARD | 0.08 |
| 2-17 | " | 40 | (IIa-2) | 100 | 195 | 0.07 |
| 2-18 | " | 40 | " | 200 | 316 | 0.07 |

EXAMPLE 3

An aqueous solution containing 1 kg of silver nitrate and an aqueous solution containing 210 grams of potassium bromide and 290 grams of sodium chloride were added simultaneously at a fixed rate over a period of 35 minutes to an aqueous solution which contained 75 grams of gelatin. Next, after removing the soluble salts, gelatin was added, chemical ripening was carried out and a silver chlorobromide emulsion (average grain size 0.27 $\mu$, bromide content 30 mol %) was obtained. Moreover, 4-hydroxy-6-methyl-1,3,3a,7-tetraazaindene was added to this emulsion as a stabilizer.

Sensitizing dyes included in formula (Ia) and compounds included in formula (IIa) or (IIb) (and compounds of formula (III)) were added, as indicated in Table 3 below, to this emulsion, and then 1-hydroxy-3,5-dichlorotriazine sodium salt was added as a film hardening agent and sodium dodecylbenzenesulfonate was added as a coating promotor, after which an ethyl acrylate polymer latex was added and the mixture was coated onto a poly(ethylene terephthalate) film in such A solution obtained by adding sodium dodecylbenzenesulfonate as a surfactant and silica as a matting agent to an aqueous gelatin solution was coated over the top as a protective layer.

The film samples so obtained were subjected to an optical wedge exposure through a dark red filter (SC-66 made by Fuji Photo Film Co., Ltd.), developed using an LD-835 development bath made by Fuji Photo Film co., Ltd. for a period of 20 seconds at 38° C., fixed, washed with water and dried. Density measurements were made using a P-type densitometer made by Fuji Photo Film Co., Ltd., and the photographic speed and fog values were obtained. The reference point of optical density at which the photographic speed was determined was fog +0.5.

It is clear from the results shown in Table 3 that the combinations of the present invention provided higher photographic speeds than the samples containing comparative dyes or the dyes alone. Furthermore, higher speeds were obtained by adding a compound of formula (III).

TABLE 3

| No. | SENSITIZING DYE OF FORM. (I) | AMOUNT USED ($\times 10^{-6}$ mol/kg. EMULSION) | COMPOUNDS OF FORM. II AND GEN FORM III | AMOUNT USED (kg. EMULSION) | | | RELATIVE SPEED | FOG |
|---|---|---|---|---|---|---|---|---|
| 3-1 | Ia-4 | 30 | — | — | | | 100 | 0.05 |
| 3-2 | " | 60 | — | — | | | 81 | 0.05 |
| 3-3 | " | 30 | IIa-3 | 220 | — | | 617 | 0.05 |
| 3-4 | " | 60 | " | 220 | — | | 708 | 0.05 |
| 3-5 | " | 60 | IIa-3 | 220 | III-2 | 120 | 891 | 0.04 |
| 3-6 | " | 60 | " | 220 | " | 240 | 955 | 0.04 |
| 3-7 | " | 30 | IIb-3 | 220 | — | | 517 | 0.05 |
| 3-8 | " | 60 | " | 220 | — | | 593 | 0.05 |
| 3-9 | " | 60 | IIb-3 | 220 | III-2 | 120 | 747 | 0.04 |
| 3-10 | " | 60 | " | 220 | " | 240 | 801 | 0.04 |
| 3-11 | " | 30 | IIb-5 | 220 | — | | 508 | 0.05 |
| 3-12 | " | 60 | " | 220 | — | | 580 | 0.05 |
| 3-13 | " | 60 | IIb-5 | 220 | III-2 | 120 | 730 | 0.04 |
| 3-14 | " | 40 | " | 220 | " | 240 | 783 | 0.04 |
| 3-15 | " | 30 | IIa-5 | 220 | — | | 562 | 0.05 |
| 3-16 | " | 60 | " | 220 | — | | 631 | 0.05 |
| 3-17 | " | 60 | IIa-5 | 220 | III-2 | 120 | 871 | 0.04 |
| 3-18 | Ia-4 | 60 | IIa-5 | 220 | III-2 | 240 | 933 | 0.04 |
| 3-19 | " | 30 | IIa-12 | 220 | — | | 501 | 0.05 |
| 3-20 | " | 60 | " | 220 | — | | 617 | 0.05 |
| 3-21 | " | 60 | IIa-12 | 220 | III-2 | 120 | 741 | 0.05 |
| 3-22 | " | 60 | " | 220 | " | 240 | 776 | 0.04 |
| 3-23 | Ia-4 | 60 | IIa-3 | 220 | COM- | 120 | 631 | 0.05 |

TABLE 3-continued

| No. | SENSITIZING DYE OF FORM. (I) | AMOUNT USED ($\times 10^{-6}$ mol/kg. EMULSION) | COMPOUNDS OF FORM. II AND GEN FORM III | AMOUNT USED (kg. EMULSION) | | RELATIVE SPEED | FOG |
|---|---|---|---|---|---|---|---|
| 3-24 | " | 60 | " | 220 | COMPOUND A 240 | 575 | 0.05 |
| 3-25 COMPARISON | DYE A | 30 | — | — | | 85 | 0.06 |
| 3-26 COMPARISON | " | 60 | — | — | | 78 | 0.06 |
| 3-27 COMPARISON | " | 30 | IIa-3 | 220 | — | 89 | 0.06 |
| 3-28 COMPARISON | " | 60 | " | 220 | — | 81 | 0.06 |
| 3-29 COMPARISON | " | 60 | " | 220 | III-2 120 | 135 | 0.06 |
| 3-30 COMPARISON | " | 60 | " | 220 | " 240 | 132 | 0.06 |

DYE A

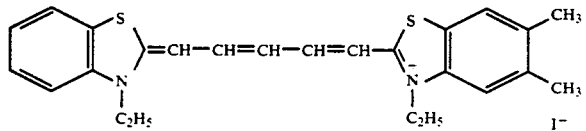

COMPOUND A

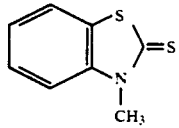

EXAMPLE 4

Samples were obtained in the same way as in Example 3, except that the sensitizing dyes of formula (Ib) shown in Table 4 below, were used in place of the sensitizing dyes of formula (Ia), and the results obtained are shown in Table 4. It is clear that photosensitive materials with a high photographic speed and little fog were obtained with the combinations of the present invention.

TABLE 4

| No. | SENSITIZING DYE OF FORM. (Ik) | AMOUNT USED ($\times 10^{-6}$ mol/kg Emul.) | COMPOUNDS OF FORM. (II). AND GEN. FORM. (III). | AMOUNT USED (mg/kg. Emulsion) | | RELATIVE SPEED | FOG |
|---|---|---|---|---|---|---|---|
| 4-1 | Ib-4 | 40 | — | — | | 100 STANDARD | 0.05 |
| 4-2 | " | 80 | — | — | | 83 | 0.05 |
| 4-3 | " | 40 | IIa-3 | 220 | — | 575 | 0.05 |
| 4-4 | " | 80 | " | 220 | — | 692 | 0.05 |
| 4-5 | " | 80 | IIa-3 | 220 | III-2 120 | 813 | 0.04 |
| 4-6 | " | 80 | " | 220 | " 240 | 851 | 0.04 |
| 4-7 | " | 40 | IIb-3 | 220 | — | 482 | 0.05 |
| 4-8 | " | 80 | " | 220 | — | 580 | 0.05 |
| 4-9 | " | 80 | IIb-3 | 220 | III-2 120 | 681 | 0.04 |
| 4-10 | " | 80 | " | 220 | " 240 | 713 | 0.04 |
| 4-11 | " | 40 | IIb-5 | 220 | — | 451 | 0.05 |
| 4-12 | " | 80 | " | 220 | — | 542 | 0.05 |
| 4-13 | " | 80 | IIb-5 | 220 | III-2 120 | 638 | 0.04 |
| 4-14 | " | 80 | " | 220 | " 240 | 667 | 0.04 |
| 4-15 | " | 40 | IIa-5 | 220 | — | 525 | 0.05 |
| 4-16 | " | 80 | " | 220 | — | 631 | 0.05 |
| 4-17 | " | 80 | IIa-5 | 220 | III-2 120 | 759 | 0.04 |

| No. | SENSITIZING DYE OF FORM. (Ib) | AMOUNT USED (mol/kg. EMULSION) | COMPOUNDS OF FORM. (II) AND GEN. FORM. (III) | AMOUNT USED kg. EMULSION | | RELATIVE SPEED | FOG |
|---|---|---|---|---|---|---|---|
| 4-18 | Ib-4 | 80 | IIa-5 | 220 | III-2 240 | 794 | 0.04 |
| 4-19 | " | 40 | IIa-12 | 220 | — | 457 | 0.05 |
| 4-20 | " | 80 | " | 220 | — | 562 | 0.05 |
| 4-21 | " | 80 | IIa-12 | 220 | III-2 120 | 617 | 0.05 |
| 4-22 | " | 80 | " | 220 | " 240 | 646 | 0.04 |
| 4-23 | Ib-4 | 80 | IIa-5 | 220 | COMPOUND A 120 | 513 | 0.05 |
| 4-24 | " | 80 | " | 220 | COMPOUND A 240 | 479 | 0.05 |
| 4-25 | DYE A | 40 | — | — | | 85 | 0.06 |

TABLE 4-continued

| | | | | | | | |
|---|---|---|---|---|---|---|---|
| COMPARISON 4-26 | | 80 | — | | — | 78 | 0.06 |
| COMPARISON 4-27 | | 4.0 | IIa-5 | 220 | — | 87 | 0.06 |
| COMPARISON 4-28 | | 80 | " | 220 | — | 83 | 0.06 |
| COMPARISON 4-29 | | 80 | " | 220 | III-2 | 120 | 138 | 0.06 |
| COMPARISON 4-30 | | 80 | " | 220 | " | 240 | 132 | 0.06 |

DYE A

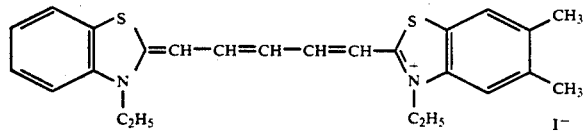

COMPOUND A

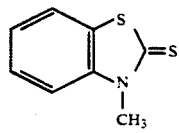

EXAMPLE 5

Samples which had been prepared in the same way as described in Example 3 were stored for 3 days under conditions of high temperature and humidity (50° C., 75% relative humidity (RH)) and then exposed, developed, stopped, fixed, washed and dried in the same way as described above together with samples which had been stored for 3 days at room temperature (20° C., 60% RH) for comparison. The results obtained are shown in Table 5.

tion of the silver halide grains. Moreover, 180 mg of 4-hydroxy-6-methyl-1,3,3a,7-tetraazaindene was added to the emulsion as a stabilizer. Moreover, sensitizing dyes included in formula (Ia) and compounds included in formula (IIa) or (IIb) were added as indicated in Table 6 below, and 230 mg of compound (III-6) was added. The mixture was then maintained at 40° C. and 350 mg of a poly(alkylene oxide) compound (of which the formula is indicated below) and 1.2 grams of sodium dodecylbenzenesulfonate were added and the mixture was stirred. Film hardening agents were added after

TABLE 5

| No. | SENSITIZING DYE OF FORM. (Ia) | AMOUNT USED ($\times 10^{-6}$ mol/kg. EMULSION) | COMPOUND OF FORM. (II) AND FORM. (III) AMOUNT USED (kg. EMULSION) | | | | ROOM TEMPERATURE (20° C. 60% RH) STORAGE | | HIGH TEMPERATURE/MIN HUMIDITY (50° C. 75% RH) STORAGE | |
|---|---|---|---|---|---|---|---|---|---|---|
| | | | | | | | RELATIVE SPEED | FOG | RELATIVE SPEED | FOG |
| 5-1 | Ia-7 | 50 | — | | — | | 100 (STANDARD) | 0.05 | 43 | 0.07 |
| 5-2 | " | 50 | IIa-2 | 140 | — | | 457 | 0.05 | 447 | 0.06 |
| 5-3 | " | 50 | " | 280 | — | | 501 | 0.04 | 479 | 0.05 |
| 5-4 | " | 50 | — | | III-3 | 170 | 141 | 0.05 | 107 | 0.05 |
| 5-5 | " | 50 | IIa-2 | 140 | III-3 | 170 | 692 | 0.04 | 676 | 0.04 |
| 5-6 | " | 50 | " | 280 | " | 170 | 776 | 0.04 | 759 | 0.04 |
| 5-7 | Ia-12 | 50 | — | | — | | 100 (STANDARD) | 0.05 | 42 | 0.07 |
| 5-8 | " | 50 | IIa-2 | 140 | — | | 603 | 0.05 | 575 | 0.06 |
| 5-9 | " | 50 | " | 280 | — | | 661 | 0.04 | 631 | 0.05 |
| 5-10 | " | 50 | — | | III-3 | 170 | 141 | 0.05 | 110 | 0.05 |
| 5-11 | " | 50 | IIa-2 | 140 | III-3 | 170 | 759 | 0.04 | 741 | 0.04 |
| 5-12 | " | 50 | " | 280 | " | 170 | 832 | 0.04 | 813 | 0.04 |

It is clear from the results shown in Table 5 that the combinations of the present invention not only provided high photographic speeds but also provided materials with which the loss of speed and the increase in fog on storage under conditions of high temperature and high humidity were small.

EXAMPLE 6

A silver chloroiodobromide emulsion (grain size 0.25 μ, bromide content 19.9 mol %, iodide content 0.1 mol %) was prepared with gold and sulfur sensitization in the same way as described in Example 3. On this occasion, $5 \times 10^{-7}$ mol/mol·Ag of rhodium and $6 \times 10^{-7}$ mol/mol·Ag of iridium were added during the preparastanding for 1 hour or 15 hours and then 15 grams/500 grams·emulsion of the polymer latex disclosed in JP-B-45-5331 was added, 1,3-vinylsulfonyl-2-propanol was added as a film hardening agent, and the mixture was coated on a poly(ethylene terephthalate) support to provide a coated silver weight of 4.0 grams per square meter.

The speed was obtained from the reciprocal of the exposure required to give a 50% dot.

TABLE 6

| No. | SENSITIZING DYE OF FORM. (I) | AMOUNT USED ($\times 10^{-6}$ mol/kg. EMULSION) | COMPOUND OF FORMULA (II) AMOUNT USED (mg/kg. EMULSION) | | EMULSION LIQUID STORAGE TIME 1 HOUR RELATIVE SPEED | FOG | EMULSION LIQUID STORAGE TIME 15 HOURS RELATIVE SPEED | FOG |
| --- | --- | --- | --- | --- | --- | --- | --- | --- |
| 6-1 | Ia-2 | 35 | — | | 100 (STANDARD) | 0.05 | 45 | 0.07 |
| 6-2 | " | 70 | — | | 83 | 0.05 | 49 | 0.07 |
| 6-3 | " | 35 | IIa-2 | 180 | 603 | 0.05 | 589 | 0.05 |
| 6-4 | " | 70 | " | 180 | 724 | 0.05 | 708 | 0.05 |
| 6-5 | Ia-5 | 35 | — | | 100 (STANDARD) | 0.05 | 54 | 0.07 |
| 6-6 | " | 70 | — | | 79 | 0.05 | 46 | 0.07 |
| 6-7 | " | 35 | IIa-3 | 180 | 525 | 0.04 | 513 | 0.04 |
| 6-8 | " | 70 | " | 180 | 631 | 0.05 | 617 | 0.04 |
| 6-9 | Ia-10 | 35 | — | | 100 (STANDARD) | 0.05 | 51 | 0.07 |
| 6-10 | " | 70 | — | | 85 | 0.05 | 45 | 0.08 |
| 6-11 | " | 35 | IIa-4 | 180 | 490 | 0.04 | 468 | 0.04 |
| 6-12 | " | 70 | " | 180 | 692 | 0.05 | 676 | 0.05 |

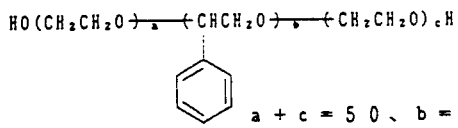

$$HO(CH_2CH_2O)_a\text{---}(CHCH_2O)_b\text{---}(CH_2CH_2O)_cH$$
$$a + c = 50, \quad b = 8$$

Moreover, a solution obtained by adding sodium dodecylbenzenesulfonate as a surfactant and poly(methyl methacrylate) polymer as a matting agent to an aqueous gelatin solution was coated over the top as a protective layer and dried to provide samples.

These samples were brought into contact with a gray contact screen for negative purposes (150 L/inch, made by Dainippon Screen Co., Ltd.) and exposed through a step wedge with a step difference of 0.1 (log E) using a semiconductor laser (TP:ML-4001, made by Mitsubishi Denki K.K.) in accordance with the method disclosed in JP-A-57-151933.

After exposure, the samples were developed for 30 seconds at 34° C. in an automatic processor using a development bath GR-D1 made by Fuji Photo Film Co., Ltd.

It is clear from the results shown in Table 6 that combinations of this invention showed little desensitization or increase in fogging due to storage of the emulsion in liquid form prior to coating when compared to cases in which dyes were used alone.

EXAMPLE 7

Film samples prepared in the same way as in Example 4 were stored for 3 days under conditions of high temperature and humidity (50° C., 75% RH) and these were then exposed, developed, stopped, fixed, washed and dried in the same way as described above together with samples which had been stored for 3 days at room temperature (20° C., 60% RH) for comparison. The results obtained are shown in Table 7.

TABLE 7

| No. | SENSITIZING DYE OF FORM. (Ib) | AMOUNT USED ($\times 10^{-6}$ mol/kg. EMULSION) | COMPOUND OF FORM. (II) AND FORM. (III) AMOUNT USED (mg/kg. EMULSION) | | | | ROOM TEMPERATURE (20° C. 60% RH) STORAGE | | HIGH TEMPERATURE/HIGH HUMIDITY (50° C. 75% RH) STORAGE | |
| --- | --- | --- | --- | --- | --- | --- | --- | --- | --- | --- |
| 7-1 | Ib-7 | 60 | — | | — | | 100 (STANDARD) | 0.05 | 45 | 0.07 |
| 7-2 | " | 60 | IIa-1 | 140 | — | | 427 | 0.05 | 407 | 0.06 |
| 7-3 | " | 60 | " | 280 | — | | 479 | 0.04 | 457 | 0.05 |
| 7-4 | " | 60 | — | | III-3 | 180 | 145 | 0.05 | 110 | 0.05 |
| 7-5 | " | 60 | IIa-1 | 140 | III-3 | 180 | 646 | 0.04 | 631 | 0.04 |
| 7-6 | " | 60 | " | 280 | " | 180 | 692 | 0.04 | 676 | 0.04 |
| 7-7 | Ib-12 | 60 | — | | — | | 100 (STANDARD) | 0.05 | 43 | 0.07 |
| 7-8 | " | 60 | IIa-1 | 140 | — | | 468 | 0.05 | 447 | 0.06 |
| 7-9 | " | 60 | " | 280 | — | | 525 | 0.04 | 501 | 0.05 |
| 7-10 | " | 60 | — | | III-3 | 180 | 145 | 0.05 | 107 | 0.05 |
| 7-11 | " | 60 | IIa-1 | 140 | III-3 | 180 | 741 | 0.04 | 724 | 0.04 |
| 7-12 | " | 60 | " | 280 | " | 180 | 794 | 0.04 | 776 | 0.04 |

EXAMPLE 8

Samples were prepared in the same way as in Example 6, except that sensitizing dyes of formula (Ib) were used as shown in Table 8 in place of the sensitizing dyes of formula (Ia), and the results obtained are shown in Table 8.

TABLE 8

| No. | SENSITIZING DYE OF FORM. (Ib) | | COMPOUND OF FORM. (II) AMOUNT USED (mg/kg EMULSION) | | EMULSION LIQUID STORAGE TIME 1 HOUR | | EMULSION LIQUID STORAGE TIME 15 HOURS | |
|---|---|---|---|---|---|---|---|---|
| | | | | | RELATIVE SPEED | FOG | RELATIVE SPEED | FOG |
| 8-1 | Ib-2 | 35 | — | | 100 (STANDARD) | 0.05 | 55 | 0.07 |
| 8-2 | " | 70 | — | | 79 | 0.05 | 50 | 0.07 |
| 8-3 | " | 35 | IIa-2 | 200 | 537 | 0.05 | 525 | 0.05 |
| 8-4 | " | 70 | | 200 | 603 | 0.05 | 589 | 0.05 |
| 8-5 | Ib-5 | 35 | — | | 100 (STANDARD) | 0.05 | 52 | 0.07 |
| 8-6 | " | 70 | — | | 71 | 0.05 | 47 | 0.07 |
| 8-7 | " | 35 | IIa-3 | 200 | 490 | 0.04 | 468 | 0.04 |
| 8-8 | " | 70 | | 200 | 550 | 0.05 | 537 | 0.05 |
| 8-9 | Ib-10 | 35 | — | | 100 (STANDARD) | 0.05 | 55 | 0.07 |
| 8-10 | " | 70 | — | | 77 | 0.05 | 41 | 0.07 |
| 8-11 | " | 35 | IIa-4 | 200 | 457 | 0.04 | 437 | 0.04 |
| 8-12 | " | 70 | | 200 | 661 | 0.05 | 640 | 0.05 |

It is clear from the results shown in Table 8 that with the combinations of the present invention the desensitization and increase in fogging due to storage of the emulsion in a liquid form prior to coating were small when compared to those in cases where the dyes were used alone.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion comprising a combination of at least one infrared sensitizing dye represented by formula (Ia) or (Ib) and at least one compound represented by formula (IIa) or (IIb):

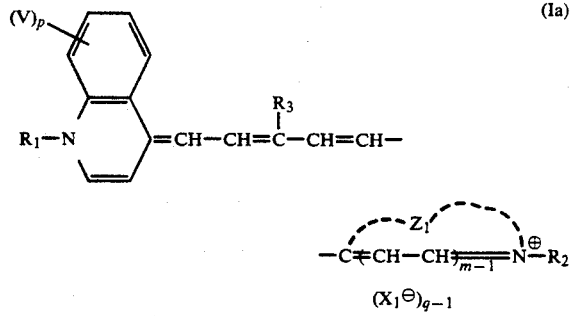

(Ia)

wherein $R_1$ and $R_2$ may be the same or different, and each represents an alkyl group; $R_3$ represents a hydrogen atom, a lower alkyl group, a lower alkoxy group, a phenyl group, a benzyl group or a phenethyl group; V represents a hydrogen atom, a lower alkyl group, an alkoxy group or a halogen atom; $Z_1$ represents a group of non-metal atoms which is required to complete a five or six membered nitrogen-containing heterocyclic ring; $X_1$ represents an acid anion; and m, p and q each independently represents 1 or 2, provided that when an intramolecular salt is formed, then q is 1,

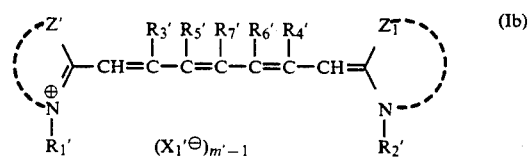

(Ib)

wherein $R_1'$ and $R_2'$ may be the same or different and each represents an alkyl group; $R_3'$ and $R_4'$ each individually represents a hydrogen atom, a lower alkyl group, a lower alkoxy group, a phenyl group, a benzyl group or a phenethyl group; $R_5'$ and $R_6'$ each represents a hydrogen atom, or $R_5'$ and $R_6'$ may be joined together to form a divalent alkylene group; $R_7'$ represents a hydrogen atom, a lower alkyl group, a lower alkoxy group, a phenyl group, a benzyl group or

group, wherein $W_1'$ and $W_2'$ each independently represents an alkyl group or an aryl group, or $W_1'$ and $W_2'$ may be joined together to form a five or six membered nitrogen-containing heterocyclic ring; $R_3'$ and $R_7'$, or $R_4'$ and $R_7'$, may be joined together to form a divalent alkylene group; $Z'$ and $Z_1'$ each independently represents a group of non-metal atoms which is required to complete a five or six membered nitrogen-containing heterocyclic ring; $X_1'$ represents an acid anion; and m' represents 1 or 2, provided that when the dye forms an intramolecular salt, then m' is 1, and

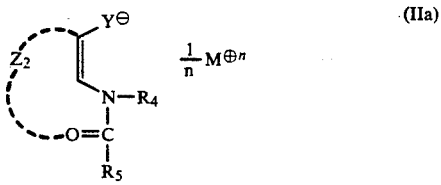

(IIa)

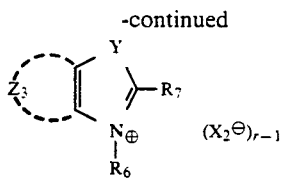

wherein R₄ represents an alkyl group or an alkenyl group; R₆ represents a substituted alkyl group or a substituted alkenyl group; R₅ and R₇ each represents a hydrogen atom, an alkyl group or an aryl group; Y represents an oxygen atom, a sulfur atom, a selenium atom or a tellurium atom; Z₂ and Z₃ each represents atoms which are required to complete an aromatic ring; M⊕ₙ represents an onium ion, an ion of a group IA or group IIA element, or a cation of atomic valency n selected from among the metal ions of groups IIB, VIIB, IVA or VA; X₂ has the same significance as X₁ in formula (I); and r represents 1 or 2, provided that when the compound forms an intramolecular salt, then r is 1.

2. The emulsion according to claim 1, wherein:
R₁ and R₂ each represents a substituted or unsubstituted alkyl group,
R₃ represents a hydrogen atom, a lower alkyl group which has from 1 to 4 carbon atoms, a lower alkoxy group which has from 1 to 4 carbon atoms, a phenyl group, a benzyl group or a phenethyl group,
V represents a hydrogen atom, a lower alkyl group which has from 1 to 4 carbon atoms, an alkoxy group which has from 1 to 4 carbon atoms or a halogen atom,
Z₁ represents a group of non-metal atoms which is required to form a five or six membered nitrogen-containing heterocyclic group, and the ring which is formed is a thiazole nucleus, selenazole nucleus, an oxazole nucleus, a quinoline nucleus, a 3,3-dialkylindolenine nucleus, an imidazole nucleus or a pyridine nucleus,
X₁ represents chloride, bromide, iodide, tetrafluoroborate, hexafluorophosphate, methylsulfate, ethylsulfate, benzenesulfonate, 4-methylbenzenesulfonate, 4-chlorobenzenesulfonate, 4-nitrobenzenesulfonate, trifluoromethanesulfonate or perchlorate.

3. The emulsion according to claim 2, wherein Z₁ is a thiazole nucleus, a selenazole nucleus or an oxazole nucleus.

4. The emulsion according to claim 3, wherein Z₁ is a benzothiazole nucleus, a naphthothiazole nucleus, a benzoselenazole nucleus, a naphthoselenazole nucleus or a naphthoxazole nucleus.

5. The emulsion according to claim 3, wherein Y is a sulfur atom or a selenium atom.

6. The emulsion according to claim 1, which contains the compounds represented by formula (IIa).

7. The emulsion according to claim 1, wherein the infrared sensitizing dyes represented by formula (Ia) or (Ib) are present in the silver halide photographic emulsion in an amount of from $5 \times 10^{-7}$ mol to $5 \times 10^{-3}$ mol per mol of silver halide.

8. The emulsion according to claim 1, wherein the compounds represented by formula (IIa) or (IIb) are present in the emulsion in an amount of from about 0.01 gram to about 5 grams per mol of silver halide.

9. The emulsion according to claim 1, wherein the proportion of the infrared sensitizing dye of formula (Ia) or (Ib) and the compound represented by the formula (IIa) or (IIb) is 1/1 to 1/300 by weight.

10. The emulsion according to claim 1, which further contains at least are compound of formula (III):

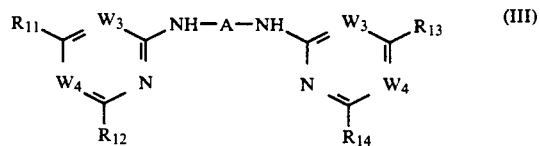

wherein A represents a divalent aromatic residual group; R₁₁, R₁₂, R₁₃ and R₁₄ each represents a hydrogen atom, a hydroxyl group, an alkyl group, an alkoxy group, an aryloxy group, a halogen atom, a heterocyclic nucleus, a heterocyclicthio group, an arylthio group, an amino group, a substituted or unsubstituted alkylamino group, a substituted or unsubstituted arylamino group, a substituted or unsubstituted aralkylamino group or a mercapto group, provided that at least one of the groups represented by A, R₁₁, R₁₂, R₁₃ and R₁₄ has a sulfo group; W₃ and W₄ each represents —CH= or —N= groups, provided that at least one of W₃ and W₄ represents an —N=group.

11. The emulsion according to claim 10, wherein —A— in formula (III) represents a divalent aromatic residual group which may contain an —SO₃M group, wherein M represents a hydrogen atom or a cation which provides water solubility, and is selected from among —A₁— and —A₂—, and when there is no —SO₃M group in R₁₁, R₁₂, R₁₃ or R₁₄, then —A— is selected from among the —A₁— group:

—A₁—:

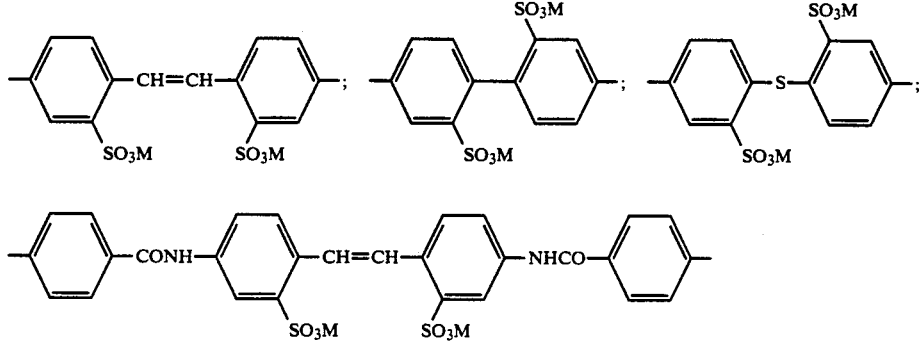

-continued

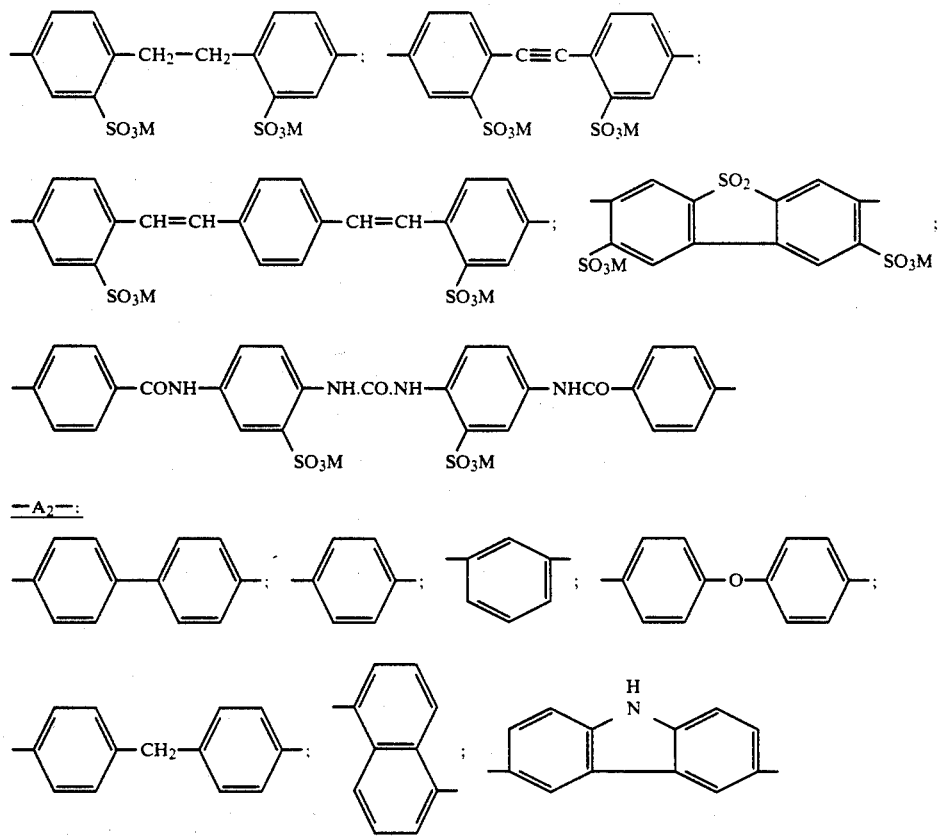

12. The emulsion according to claim 10, wherein the compound represented by formula (III) is present in an amount of from about 0.01 gram to about 5 grams per mol of silver halide in the emulsion.

13. The emulsion according to claim 10, wherein the proportion of the infrared sensitizing dye and the compound represented by formula (III) is such that the value of the ratio of the sensitizing dye to the compound represented by formula (III) is from 1/1 to 1/200 by weight.

* * * * *